United States Patent [19]
Takeuchi et al.

[11] Patent Number: 5,504,356
[45] Date of Patent: Apr. 2, 1996

[54] SEMICONDUCTOR ACCELEROMETER

[75] Inventors: Yukihiro Takeuchi, Seto; Toshimasa Yamamoto, Bisai; Yoshinori Ohtsuka, Okazaki; Shigeyuki Akita, Okazaki; Tadashi Hattori, Okazaki; Kazuhiko Kanou; Hirotane Ikeda, both of Chiryu, all of Japan

[73] Assignee: Nippondenso Co., Ltd., Kariya, Japan

[21] Appl. No.: 152,505

[22] Filed: Nov. 16, 1993

[30] Foreign Application Priority Data

| Nov. 16, 1992 | [JP] | Japan | 4-305708 |
| Dec. 25, 1992 | [JP] | Japan | 4-347244 |
| Dec. 25, 1992 | [JP] | Japan | 4-347250 |
| Sep. 16, 1993 | [JP] | Japan | 5-230520 |

[51] Int. Cl.⁶ .......................... H01L 29/78; H01L 29/84
[52] U.S. Cl. .......................... 257/254; 257/415; 257/417; 257/419
[58] Field of Search .......................... 257/254, 417, 257/419, 415

[56] References Cited

U.S. PATENT DOCUMENTS

| 3,440,873 | 4/1969 | Eichelberger | 257/254 |
| 4,481,042 | 11/1984 | Takigawa | 257/327 |
| 4,873,871 | 10/1989 | Bai | 257/419 |
| 4,894,698 | 1/1990 | Takeuchi et al. | |

FOREIGN PATENT DOCUMENTS

| 194953 | 4/1990 | European Pat. Off. |
| 57-068079 | 4/1982 | Japan. |
| 61-222178 | 10/1986 | Japan. |
| 62-147335 | 7/1987 | Japan. |
| 64-005075 | 1/1989 | Japan. |
| 01-152369 | 6/1989 | Japan. |
| 2-134570 | 5/1990 | Japan. |
| 03-107767 | 5/1991 | Japan. |
| 04-025764 | 1/1992 | Japan. |
| 04-332174 | 11/1992 | Japan. |
| 2174839 | 11/1986 | United Kingdom. |

Primary Examiner—Jerome Jackson, Jr.
Attorney, Agent, or Firm—Cushman, Darby & Cushman

[57] ABSTRACT

This invention aims at providing a novel semiconductor accelerometer comprising a smaller number of substrates and a production method thereof.

An insulating film is formed on a main plane of a P-type silicon substrate, and a beam-like movable electrode is formed on the insulating film. Fixed electrodes are then formed on both sides of the movable electrode in self-alignment with the movable electrode by diffusing an impurity into the P-type silicon substrate, and the insulating film below the movable electrode is etched and removed. There is thus produced a semiconductor accelerometer comprising the P-type silicon substrate 1, the movable electrode 4 having the beam structure and disposed above the P-type silicon substrate 1 with a predetermined gap between them, and the fixed electrodes 8, 9 consisting of the impurity diffusion layer and formed on both sides of the movable electrode 4 on the P-type silicon substrate 1 in self-alignment with the movable electrode 4. This sensor can detect acceleration from the change (increase/decrease) of a current between the fixed electrodes 8 and 9 resulting from the displacement of the movable electrode 4 due to acceleration.

25 Claims, 33 Drawing Sheets

5,504,356

SEMICONDUCTOR ACCELEROMETER

BACKGROUND OF THE INVENTION

1. Field of the Invention

This invention relates to a semiconductor accelerometer. More particularly, the present invention relates to an accelerometer suitable for control of an automobile, an engine, an air bag, etc, and a production method thereof.

2. Description of the Related Art

One of the requirements imposed on an accelerometer for automobiles is that the accelerometer can accurately detect acceleration of a relatively low level (0 to ±1 G) at a low level frequency (0 to 100 Hz). Incidentally, the term "1 G" used herein means a unit of acceleration and represents 9.8 m/sec$^2$.

A piezoelectric type sensor utilizing the piezoelectric effect, a magnetic type sensor utilizing a differential transformer, a semiconductor strain gauge type sensor and an electrostatic capacitance type sensor utilizing fine silicon etching technology, and so forth, are all well known as such accelerometers. Among them, the semiconductor type accelerometer is believed to be most promising because it can accurately detect a low level acceleration at a low frequency level, is economical, and is suitable for mass-production.

The electrostatic capacitance type sensor is characterized in that its sensitivity is higher than that of the strain gauge type.

FIG. 66 of the accompanying drawings illustrates an electrostatic capacitance type accelerometer as a prior art example disclosed in Japanese Unexamined Patent Publication (Kokai) No. 2-134570. In the electrostatic accelerometer shown in FIG. 66, a detection portion of the sensor is formed by directly bonding three silicon substrates 300, 301 and 302 through thermal oxide films 303 as insulating films and coupling them together. A silicon beam (beam-like portion) 304 and a movable electrode 305 are in advance formed on the silicon substrate 300 by an etching process before bonding. Fixed electrodes 306 and 307 made of poly-Si (silicon) are in advance formed on the silicon substrates 301 and 302, respectively. A movable electrode 305 having the function of a weight is supported by a silicon beam 304, and the dimension of a gap between the movable electrode 305 and the fixed electrodes 306, 307 changes in accordance with magnitude of acceleration acting on the movable electrode 305 in a vertical direction of the drawing. In other words, the electrostatic capacitance of the gap portion changes in accordance with acceleration acting on the detection portion, and acceleration can be detected by transmitting this change to an external electronic circuit through a bonding pad 308.

In the electrostatic type accelerometer having a structure described above, however, a high level of fabrication technique is necessary so as to etch the silicon substrate to an accuracy of 100 to 200 µm so as to form the beam and the production cost thus increases.

In other words, one silicon substrate for forming the movable electrode and two silicon substrates for forming the fixed electrodes, that is, three substrates in all, are necessary, and a reduction in cost is difficult. Furthermore, since the silicon substrates must be bonded to one another through the thermal oxide film, thermal limitations are imposed on the fabrication process. Because detection of acceleration relies on the change of the electrostatic capacitance, the electrode area for forming the electrostatic capacitance cannot be reduced below the lower limit for measurement, and the sensor cannot be made compact in size.

SUMMARY OF THE INVENTION

It is therefore an object of the present invention to provide a novel semiconductor accelerometer comprising a smaller number of substrates and a production method thereof.

To accomplish the object described, the semiconductor accelerometer according to the present invention basically employs the following construction. Namely, the first aspect of the present invention provides a semiconductor accelerometer which comprises a semiconductor substrate, a movable electrode having a beam structure and disposed above the semiconductor substrate with a predetermined gap between them, and fixed electrodes consisting of an impurity diffusion layer and disposed on both sides of a portion of the semiconductor substrate opposing the movable electrode, wherein acceleration is detected by the change in a current flowing between the fixed electrodes which is generated by displacement of the movable electrode resulting from the action of acceleration.

The second aspect of the present invention provides a semiconductor accelerometer which comprises a semiconductor substrate, a gate oxide film disposed on the semiconductor substrate, a lower gate electrode disposed on the gate oxide film, fixed electrodes consisting of an impurity diffusion layer, and, formed on both sides of the lower gate electrode on the semiconductor substrate in self-alignment with the lower gate electrode, a movable upper gate electrode having a beam structure and disposed above the semiconductor substrate at a predetermined distance from the lower gate electrode, and a lower electrode disposed at a portion of the semiconductor substrate opposing the movable upper gate electrode, wherein acceleration is detected from the change in a current between the fixed electrodes which is generated by the displacement of the movable upper gate electrode due to the action of acceleration.

A production method for the semiconductor accelerometer for accomplishing the object described above basically comprises a first step of forming a sacrificial layer on a main plane of a semiconductor substrate, a second step of forming a movable electrode having a beam structure on the sacrificial layer, a third step of forming fixed electrodes on both sides of the movable electrode in self-alignment with the movable electrode by diffusing an impurity into the semiconductor substrate, and a fourth step of etching and removing the sacrificial layer below the movable electrode so that the change of a current between the fixed electrodes resulting from the displacement of the movable electrode can be detected.

According to such a production method, the sacrificial layer is formed on the main plane of the semiconductor substrate at the first step, and the movable electrode having the beam structure is formed on the sacrificial layer at the second step. The impurity is diffused into the semiconductor substrate in self-alignment with the movable electrode at the third step, thereby forming the fixed electrodes on both sides of the movable electrode. Further, the sacrificial layer below the movable electrode is removed by etching at the fourth step, and the change of the current between both fixed electrodes resulting from the displacement of the movable electrode can thus be detected. As a result, the semiconductor accelerometer of the present invention can be produced.

Another production method of the present invention comprises a first step of forming a sacrificial layer on a main plane of a semiconductor substrate, a second step of forming a pair of mutually separated fixed electrodes by diffusing an impurity into the semiconductor substrate, a movable electrode having a beam structure on the sacrificial layer above and between the fixed electrodes, and a fourth step of etching and removing the sacrificial layer below the movable electrode so that the change of a current between both fixed electrodes resulting from the displacement of the movable electrode can be detected.

These and other objects and novel features of the present invention will become more apparent from the following detailed description of the invention when taken in conjunction with the accompanying drawings

DESCRIPTION OF THE PREFERRED EMBODIMENTS

Hereinafter, definite examples of the semiconductor accelerometer and a production method thereof according to the present invention will be described in detail with reference to the accompanying drawings.

EXAMPLE 1

First of all, the basic construction and function of the first aspect of the present invention will be explained hereby as Example 1.

As already described, the semiconductor accelerometer according to the present invention includes a semiconductor substrate 1, a movable electrode 4 having a beam structure and disposed above the semiconductor substrate 1 with a predetermined gap between them, and fixed electrodes 8 and 9 so formed on both sides of the movable electrode 4 on the semiconductor substrate 1 as to oppose each other, and detects acceleration by the change of the current that is generated between the fixed electrodes 8 and 9 by the displacement of the movable electrode 4 resulting from acceleration.

In the semiconductor accelerometer having the construction described above, when acceleration acts on the sensor, the movable electrode undergoes displacement and the current between the fixed electrodes changes. Acceleration can be detected from the increase or decrease of the current between the fixed electrodes.

A more detailed aspect of the semiconductor accelerometer according to this first aspect will be explained in further detail as the first embodiment with reference to FIGS. 1 to 13.

Figure 1:
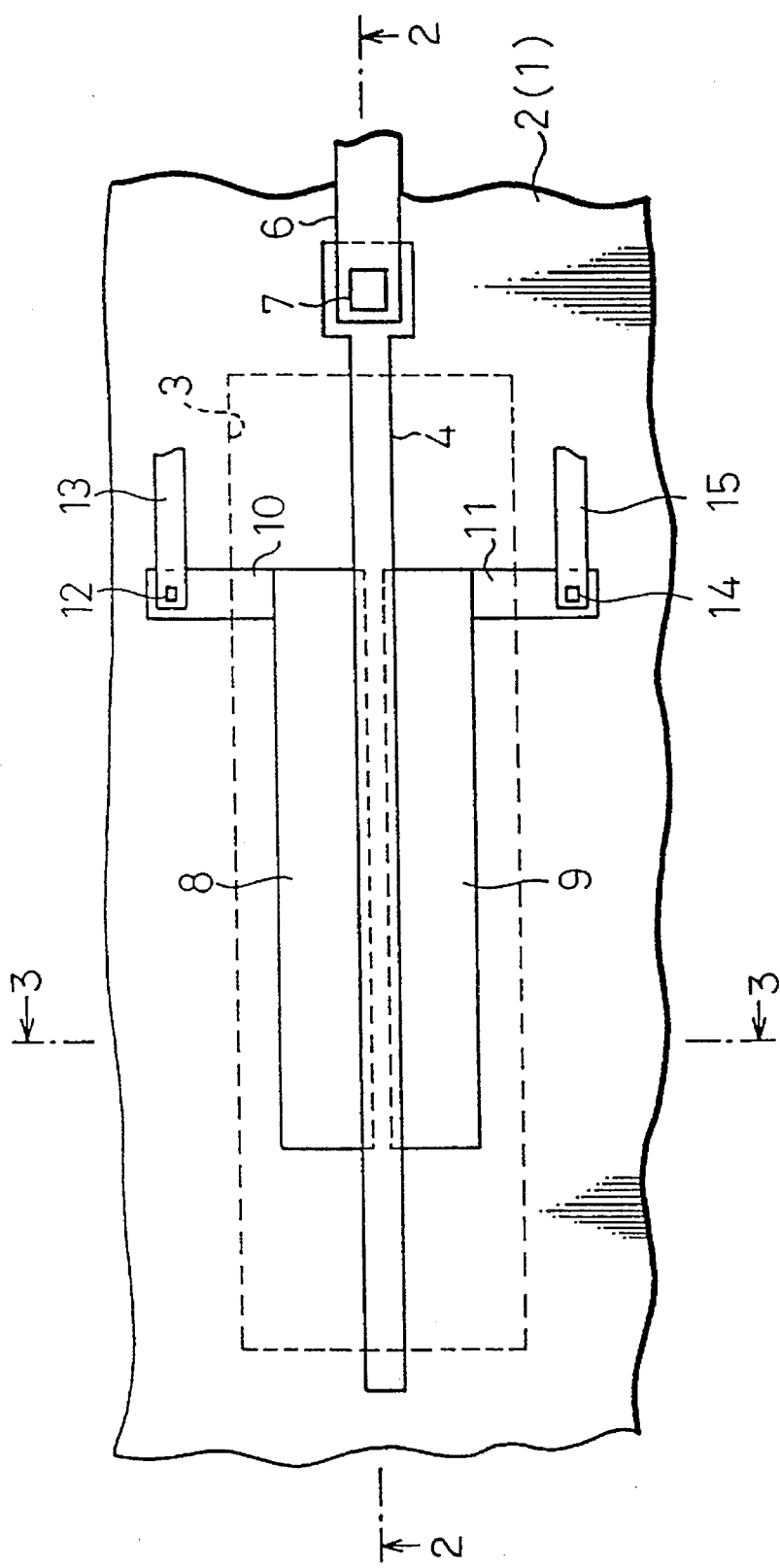
FIG. 1 is a plan view of a semiconductor accelerometer according to the first embodiment of the present invention.
Figure 2:
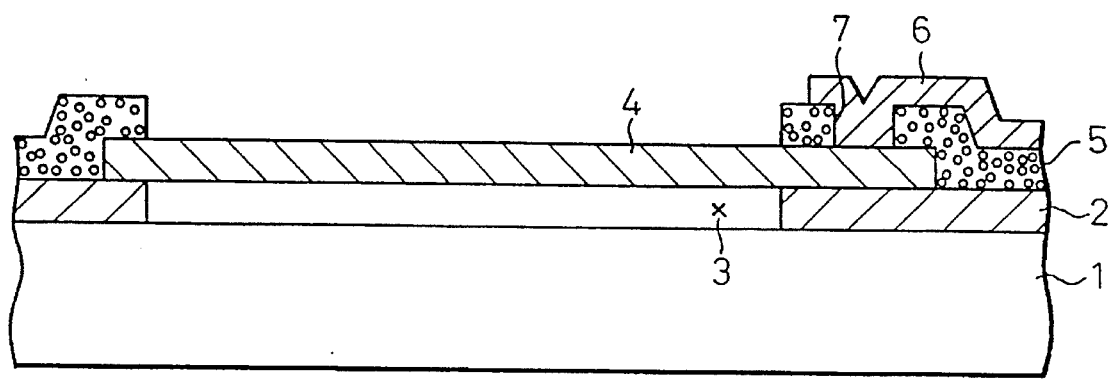
FIG. 2 is a sectional view taken along a line 2—2 in FIG. 1.
Figure 3:
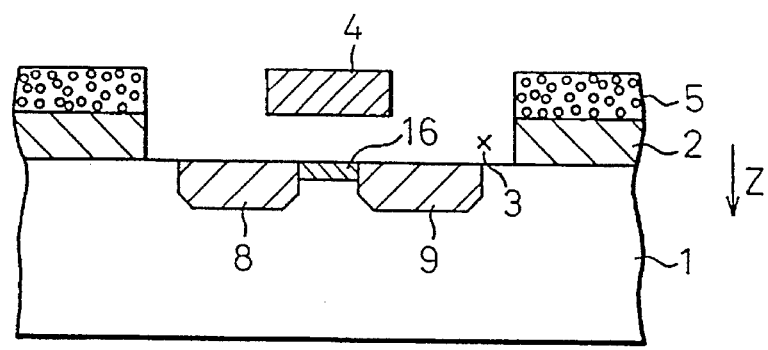
FIG. 3 is a sectional view taken along a line 3—3 of FIG. 1.

FIG. 1 is a plan view of the semiconductor accelerometer of this first embodiment. FIG. 2 is a sectional view taken along a line 2—2 of FIG. 1, and FIG. 3 is a sectional view taken along a line 3—3 of FIG. 1.

An insulating film 2 is formed on a P-type silicon substrate 1, and is made of $SiO_2$, $Si_3N_4$, or the like. A rectangular region devoid of the insulating film 2, that is, a gap portion 3, is formed on the P-type silicon substrate 1 (see FIG. 1). A movable electrode 4 having a double-support structure is disposed on the insulating film 2 in such a manner as to bridge over the gap portion 3. This movable electrode 4 is made of poly-Si which has a belt-like shape and extends linearly. The insulating film 2 electrically insulates the P-type silicon substrate 1 from the movable electrode 4.

The gap portion 3 below the movable electrode 4 is formed as a part of the insulating film 2 is etched as a sacrificial layer. When this sacrificial layer is etched, an etching solution which does not etch the movable electrode 4 but does etch the insulating film 2 as the sacrificial layer is employed.

An inter-level insulating film 5 is disposed on the insulating film 2, and an aluminum wiring 6 is disposed on this insulating film 5 so as to establish electric connection with the movable electrode 4 through a contact hole 7.

In FIG. 3, fixed electrodes 8 and 9 made of an impurity diffusion layer is formed on both sides of the movable electrode 4 on the P-type silicon substrate 1, and they are formed by introducing an N-type impurity into the P-type silicon substrate 1 by ion implantation, or like means.

A refractory metal such as tungsten may be used for the movable electrode (doubly-supported beam), besides poly-Si.

Wirings 10 and 11 made of an impurity diffusion layer are formed on the P-type silicon substrate 1 as shown in FIG. 1, and they are formed by introducing an N-type impurity into the P-type silicon substrate 1 by ion implantation, or like means. The fixed electrode 8 is connected electrically to the wiring 10 while the fixed electrode 9 is connected electrically to the wiring 11.

Further, the wiring 10 is electrically connected to an aluminum wiring 13 through a contact hole 12, while the wiring 11 is electrically connected to an aluminum wiring 15 through a contact hole 14. These aluminum wirings 13, 15 and 6 are connected to external electronic circuits.

As shown in FIG. 3, an inversion layer 16 is formed between the fixed electrodes 8 and 9 on the P-type silicon substrate 1, and this inversion layer 16 is formed as a voltage is impressed on the movable electrode (doubly-supported beam) 4.

Next, the production steps of the semiconductor accelerometer having such a construction will be explained with reference to FIGS. 4 through 13. Here, the sensor will be shown on the left-hand portion of the drawings and a transistor necessary for a processing circuit, on the right-hand portion.

Figure 4:
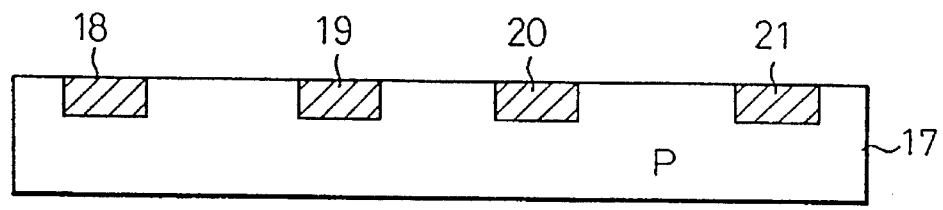
FIG. 4 through FIG. 13 are sectional views showing the production steps of the semiconductor accelerometer.

First of all, a P-type silicon substrate 17 is prepared as shown in FIG. 4, and N-type diffusion layers 18, 19, 20 and 21 as wiring portions of a sensor and source-drain of a transistor are formed by ion implantation, etc, through a photolithographic process.

Figure 5:
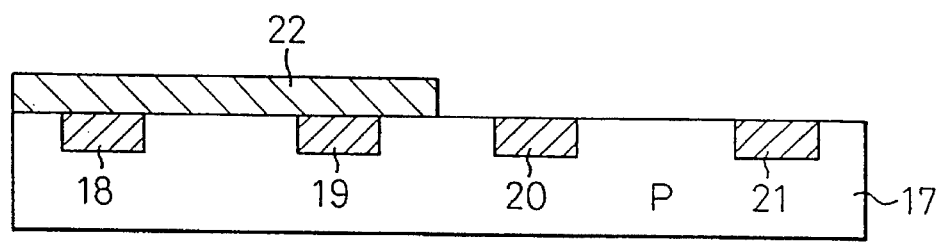

An insulating film 22, a part of which is to serve as a sacrificial layer, is formed in a sensor formation region as shown in FIG. 5. By the way, it is also possible to form the insulating film 22 on the substrate as a whole and then to remove the insulating film in the transistor formation region.

Figure 6:
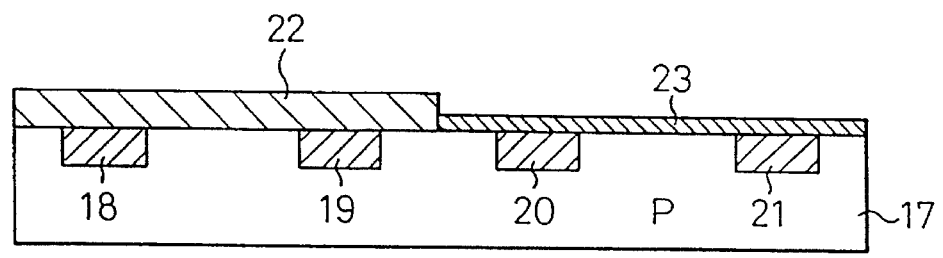
Figure 7:
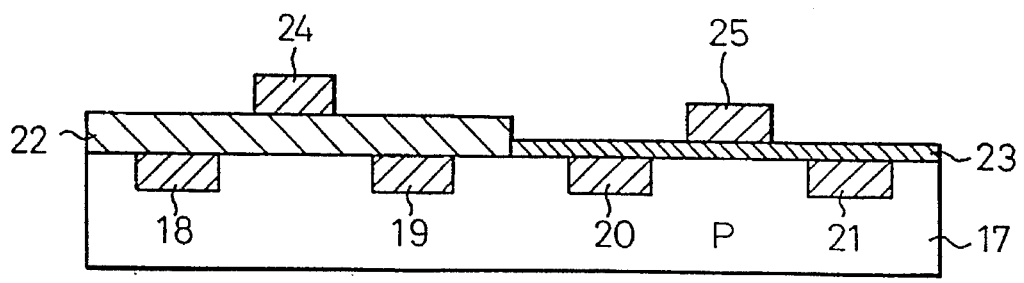

Further, a gate oxide film 23 is formed on the transistor formation region by oxidation, as shown in FIG. 6. A poly-Si film is formed as shown in FIG. 7, and then a movable electrode 24 of a sensor and a gate electrode 25 of a transistor are patterned by dry etching through a photolithographic process.

Figure 8:
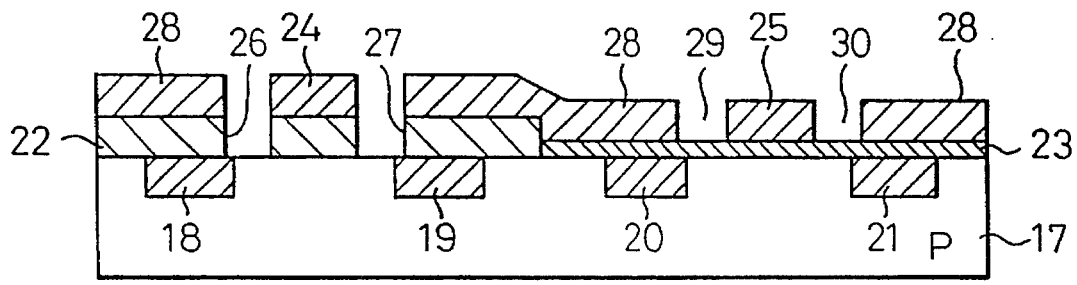

As shown in FIG. 8, subsequently, in order to form the fixed electrodes of the sensor consisting of an N-type diffusion layer, openings 26 and 27 are formed in the insulating film 22 in self-alignment with the movable electrode 24 through the photolithographic process. To form the source-drain of the transistor, openings 29 and 30 are formed using a resist 28 and a photolithographic process.

Figure 9:
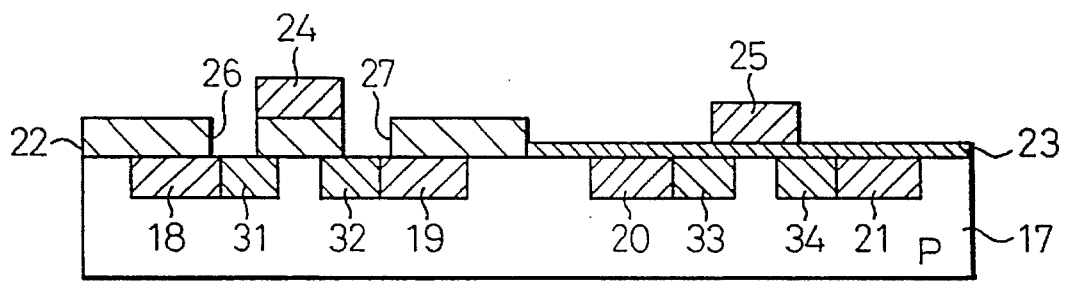

As shown in FIG. 8, an impurity is introduced by ion implantation, etc, from the openings 26, 27 of the insulating film 22 amd photoresist 28, and the openings 29, 30 of the resist 28 in self-alignment with the movable electrode 24 and the gate electrode 25, respectively, forming thereby the fixed electrodes 31, 32 of the sensor consisting of the N-type diffusion layer and the source-drain regions 33, 34 of the transistor consisting likewise of the N-type diffusion layer, as shown in FIG. 9.

Figure 10:
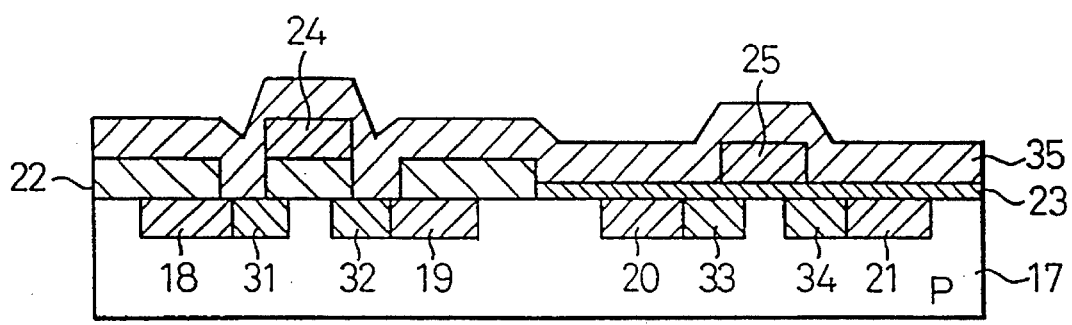
Figure 11:
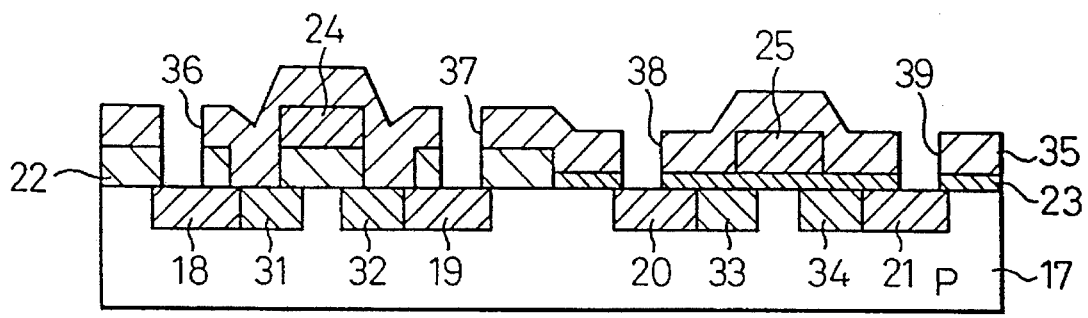

Next, as shown in FIG. 10, an inter-layer insulating film 35 is formed so as to electrically insulate the aluminum wirings from the movable electrode 24 and the gate electrode 25. Contact holes 36, 37, 38, 39 are then bored in the inter-layer insulating film 35 so as to electrically connect the diffusion layers 18, 19, 20, 21 for wiring to the aluminum wirings, as shown in FIG. 11, through the photolithographic process.

Figure 12:
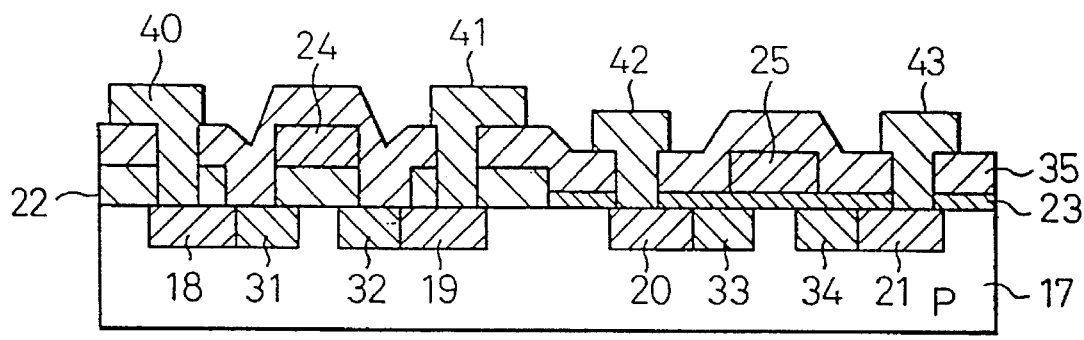
Figure 13:
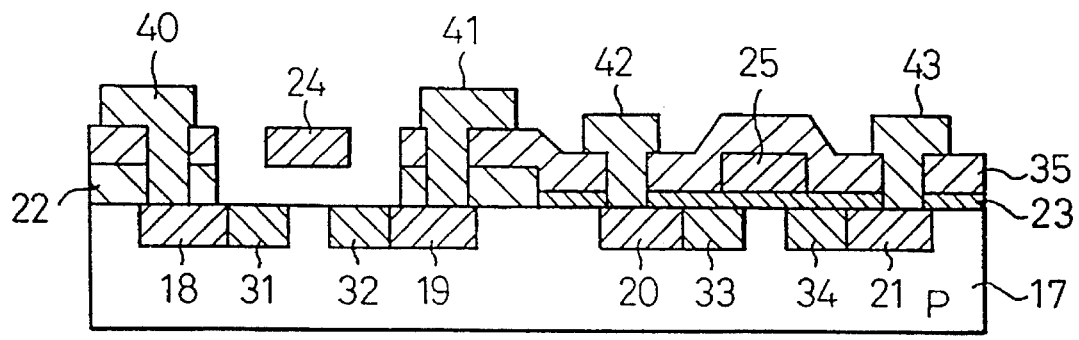

An aluminum film as an electrode material is formed, and then aluminum wirings 40, 41, 42, 43 are formed through the photolithographic process, as shown in FIG. 12. Further, a part of the inter-layer insulating film 35 and a sacrificial layer as a part of the insulating film 22 are etched as shown in FIG. 13.

In this way, the production steps for the transistor type semiconductor accelerometer are completed.

Next, the operation of the accelerometer will be explained with reference to FIG. 3.

When voltages are applied between the movable electrode 4 and the silicon substrate 1, and also between the fixed electrodes 8 and 9, the inversion layer 16 is formed and a current flows between the fixed electrode 8 and 9. When the accelerometer receives acceleration and the movable electrode 4 undergoes displacement in a Z direction in the drawing (in a vertical direction to the substrate), the carrier concentration of the inversion layer 16 increases due to the change of the electric field intensity and the current increases. In this way, the accelerometer of this embodiment can detect acceleration from the increase/decrease of the current quantity.

As described above, in the first definite embodiment of the present invention, the insulating film 22 (sacrificial layer) is formed on the main plane of the P-type silicon substrate 17 (semiconductor substrate; the first step), and the beam-like movable electrode 24 is formed on the insulating film 22 (sacrificial layer; the second step). The impurity is diffused into the P-type silicon substrate 7 (semiconductor substrate) in self-alignment with the movable electrode 24 so as to form the fixed electrodes 31, 32 on both sides of the movable electrode 24 (the third step), and the insulating film 22 (sacrificial layer) below the movable electrode 24 is removed by etching (the fourth step).

As a result, the sensor includes the P-type silicon substrate 1 (semiconductor substrate), the movable electrode 4 having a beam structure and being disposed above the P-type silicon substrate (semiconductor substrate) with a predetermined gap between them, and the fixed electrodes 8, 9 formed on both sides of the movable electrode 4 on the P-type silicon substrate (semiconductor substrate) in self-alignment with the movable electrode 4, and can detect acceleration from the change (increase/decrease) of the current between the fixed electrodes 8, 9 generated by displacement of the movable electrode 4 resulting from the action of acceleration.

As described above, this embodiment does not use the silicon substrate as the material for forming the beam but uses a thin film formed on the silicon substrate such as poly-Si doped with an impurity in a high concentration or a heat-resistant metal. Accordingly, non-uniformity of the thickness of the beam for forming the movable electrode can be reduced. Generally, when a load acts on one point of a cantilever beam or a doubly-supported beam, the change is inversely proportional to the third power of the thickness of the beam and to the first power of the beam width. Therefore, a much higher level of accuracy is required for machining the thickness of the beam than for machining its width. This embodiment does not control the thickness of the beam by etching, which has been carried out in the prior art, but by the thickness of the deposition of the thin film. Since controllability of the film thickness by this method is by far better than the etching method, controllability of the change in position of the movable electrode, when acceleration acts on the movable electrode, can be remarkably improved.

To form the beam, the sacrificial layer is formed in advance, and then the film of the beam material is formed. Thereafter, the sacrificial layer is removed by etching. By the way, the term "sacrificial layer" generally means a thin film layer which is formed in advance and which will be eventually removed in order to form the movable portion. Accordingly, variance of the gap between the fixed electrodes and the movable electrode can be reduced. Generally, the carrier concentration of the inversion layer of a transistor is inversely proportional to the size of the gap. Accordingly, the current, too, is inversely proportional to the size of the gap. This embodiment controls the size of the gap by the film thickness of the sacrificial layer, and since controllability of the film thickness by this method is excellent, controllability of the value of the current between the fixed electrodes can be remarkably improved.

Further, the pair of fixed electrodes are disposed on the silicon substrate vertically opposing the beam which forms the movable electrode, and the current is generated between the fixed electrodes so as to constitute the transistor structure which produces a change in the current by the displacement of the movable electrode. Accordingly, acceleration can be measured by detecting the displacement of the movable electrode from the change of the current between the fixed electrodes. In transistors, the drain current is generally changed by changing the gate voltage (corresponding hereby to the movable electrode). However, since the carrier concentration of the inversion layer can be changed by also changing the gap between the gate and the substrate, the drain current changes. Accordingly, in this embodiment, the change in position of the movable electrode receiving acceleration can be detected by the quantity of the current between the fixed electrodes. Because the current can thus be detected, a large electrode area which has been necessary in the capacitance detection system becomes unnecessary, and the reduction of the size of the sensor can be drastically improved.

The two fixed electrodes comprise the diffusion layer which is formed in self-alignment after the shape of the beam for forming the movable electrode is formed. Such a method can be accomplished easily by forming the shape of the beam to serve as the movable electrode, opening the window of the sacrificial layer on the portions, which are to serve as the fixed electrodes, on the silicon substrate, and then introducing the impurity by ion implantation into the portions to serve as the fixed electrodes. Accordingly, the movable electrode can always be formed easily at the center between the fixed electrodes, and positioning accuracy during the production process can be improved.

Since these production steps are those of an IC fabrication process or its application, the sensor structure can be formed during the IC fabrication process and integration with the circuit can be made very easily.

The basic structures of the first aspect and basic production methods thereof, have been described above, but a large number of modifications can be made to the first aspect.

Next, still another modified embodiment of the first aspect of the present invention, that is, the second embodiment of the first aspect will be explained as Example 2.

EXAMPLE 2

Figure 14:
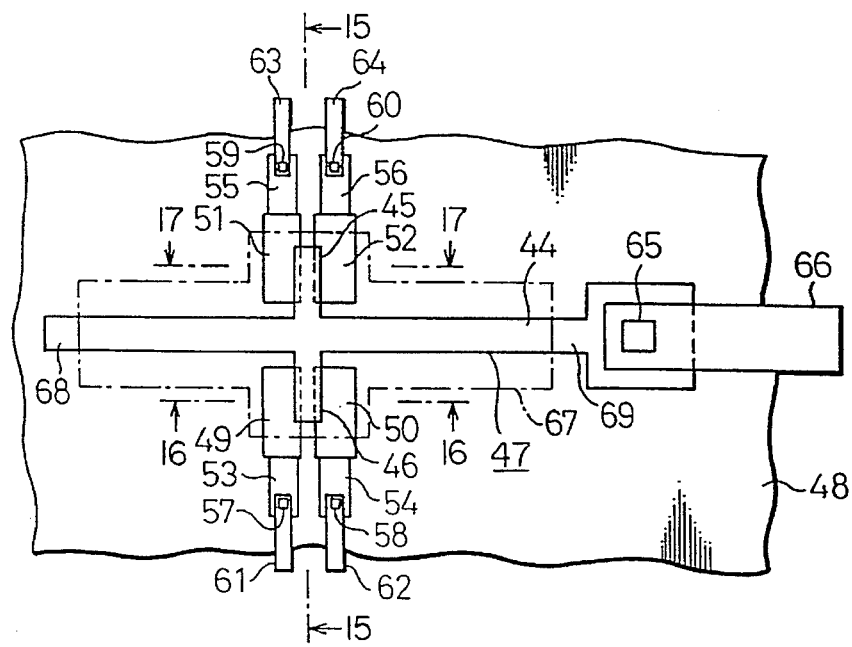
FIG. 14 is a plan view showing a semiconductor accelerometer according to the second embodiment of the present invention.
Figure 15:
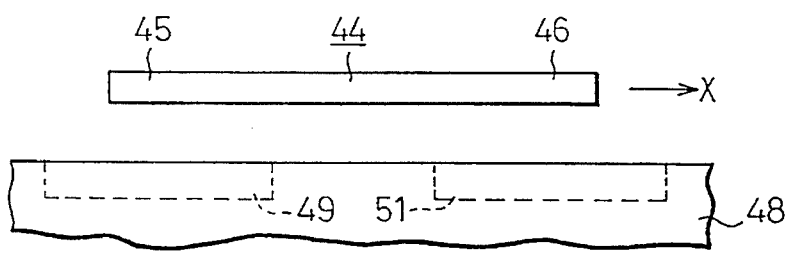
FIG. 15 is a sectional view taken along a line 15—15 of FIG. 14.
Figure 16:
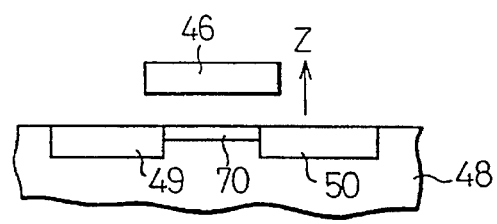
FIG. 16 is also a sectional view taken along a line 16—16 of FIG. 14.
Figure 17:
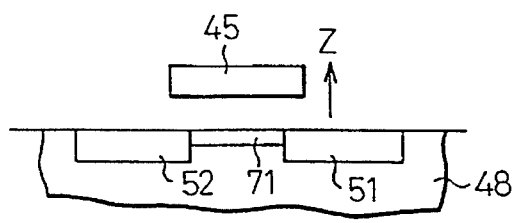
FIG. 17 is also a sectional view taken along a line 17—17 of FIG. 14.

FIG. 14 is a plan view of the accelerometer of this embodiment, FIG. 15 is a sectional view taken along a line 15—15 of FIG. 14, FIG. 16 is a sectional view taken along a line 16—16 of FIG. 14, and FIG. 17 is a sectional view taken along a line 17—17 of FIG. 14.

In the first Example shown in FIG. 1, one doubly-supported beam plays the functions as a flexible member, a weight and an electrode. In the second Example, the movable electrode 47 comprises one beam portion 44 having the functions of the flexible member and the weight and two electrode portions 45, 46 having the functions of the weight and the electrodes, and the movable electrode 47 is made of poly-Si.

Fixed electrodes 49, 50 and 51, 52 comprising an N-type diffusion layer are formed on both sides of the electrode portions 45, 46 of the movable electrode 47 on a P-type silicon substrate 48 below the electrode portions 45, 46, respectively. These fixed electrodes 49, 50, 51, 52 are connected to diffusion layers 53, 54, 55, 56 for wiring, respectively, and to aluminum wirings 61, 62, 63, 64 through contact holes 57, 58, 59, 60, respectively. The movable electrode 47 is connected to the aluminum wiring 66 through the contact hole 65.

An etching region 67 represents a region which is to be etched as a sacrificial layer among the insulating film which is not shown in the drawing, and when etching of the sacrificial layer is carried out, the movable electrode 47 (poly-Si) is fixed at two fixing ends 68, 69, and the electrode portions 45, 46 assume a movable structure.

FIG. 15 illustrates that the fixed electrodes 49, 50, 51, 52 are wider on both sides of the drawing than the electrode portions 45, 46. In FIGS. 16 and 17, a voltage is applied between the electrode portions 45, 46 and the substrate 48, and between the fixed electrodes 49 and 50 and between 51 and 52, invention layers 70, 71 are formed between the fixed electrodes 52 and 51 and between 49 and 50, and the current flows between the fixed electrodes 49 and 50 and between 51 and 52, respectively.

Next, the operation of the accelerometer capable of two-dimensional detection will be explained with reference to FIGS. 15 to 17.

When this accelerometer receives acceleration and the electrode portions (movable electrode) 45, 46 undergo displacement in the X direction (the horizontal direction of the substrate) shown in FIG. 15, the area of the inversion layer region between both fixed electrodes (the gate width in the case of the transistor) changes, so that the current flowing through the fixed electrodes 49, 50 decreases while the current flowing through the fixed electrodes 51, 52 increases, on the contrary. On the other hand, when the accelerometer receives acceleration and the electrode portions 45, 46 undergo displacement in the Z direction shown in the drawing, the carrier concentration of the inversion layers 70, 71 decreases, so that the current simultaneously decreases.

In this way, the accelerometer of this embodiment can detect two-dimensional acceleration by the increase and decrease of the two current quantities.

As described above, this embodiment employs a structure wherein a pair of combinations each comprising the movable electrode and two fixed electrodes are disposed, and one of the inversion layer regions between both fixed electrodes increases while the other decreases due to the displacement in the horizontal direction (for example, a cross is formed by the movable electrodes (beams)). Accordingly, acceleration in both the horizontal and vertical directions can be detected from the increase and decrease of the two current quantities. In other words, when the two current quantities change in the same phase, the beams undergo displacement in the vertical direction and when the two current quantities change in mutually opposite phases, on the contrary, the beams undergo displacement in the horizontal direction, and acceleration can thus be detected. This means that one acceleration detection structure can be provided for two detection directions.

EXAMPLE 3

The third embodiment of the first aspect of the present invention will be explained as Example 3.

Figure 18:
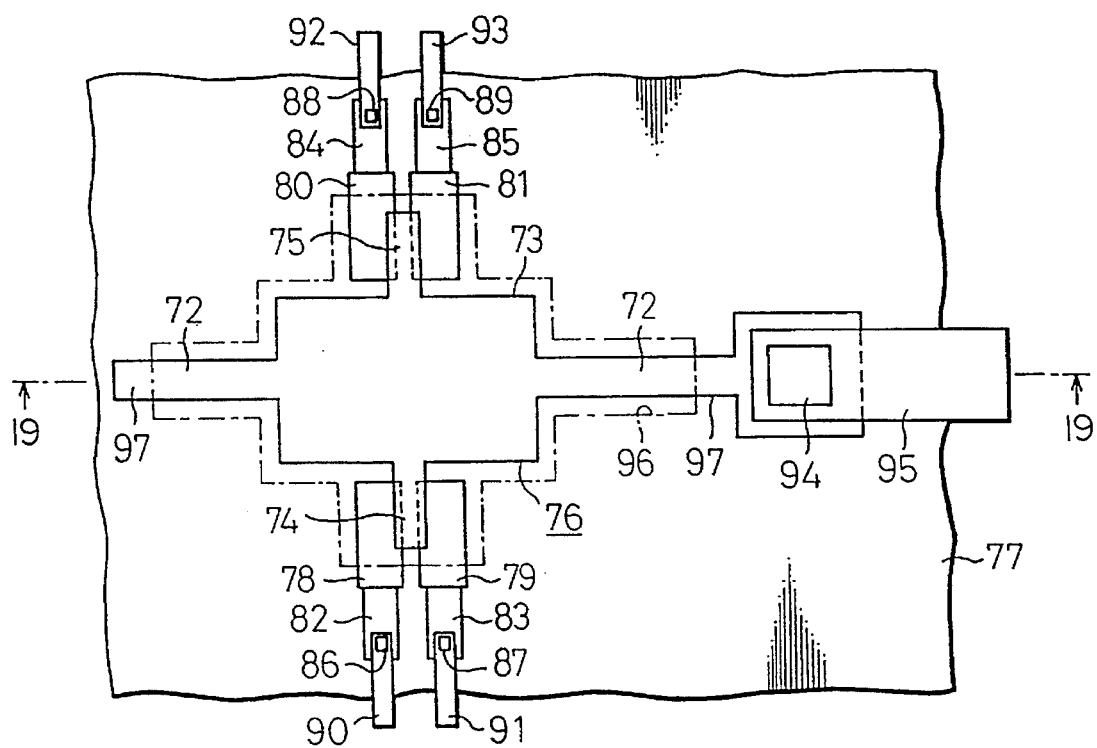
FIG. 18 is a plan view showing a semiconductor accelerometer according to the third embodiment of the present invention.
Figure 19:
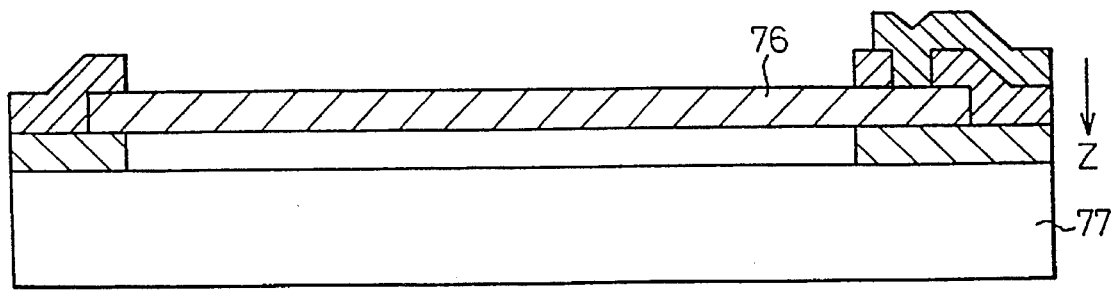
FIG. 19 is a sectional view taken along a line 19—19 of FIG. 18.

FIG. 18 is a plan view of the accelerometer of this embodiment, and FIG. 19 is a sectional view taken along a line 19—19 of FIG. 18.

In the first Example shown in FIG. 1, one doubly-supported beam functions as the flexible member, the weight and the electrode, and in the second example shown in FIG. 14, one doubly-supported beam functions as the flexible member and the weight while a pair of electrode portions functions as the weight and the electrodes. In this embodiment, a movable electrode 76 made of poly-Si comprises two beam portions 72 having the function as the flexible member, a mass portion 73 having the function as the weight and electrode portions 74, 75 having the function as the electrodes.

To improve the function of the weight, a weight material such as a metal may be placed on the mass portion 73. In this embodiment, too, fixed electrodes 78, 79, 80, 81 comprising an N-type diffusion layer are formed below and on both sides of the electrode portions 74, 75 on a P-type silicon substrate 77. These fixed electrodes (diffusion layers) 78, 79, 80, 81 are connected to diffusion layers for wiring 82, 83, 84, 85, respectively, and to aluminum wirings 90, 91, 92, 93 through contact holes 86, 87, 88, 89, respectively.

The movable electrode (poly-Si) 76 is connected to the aluminum wiring 95 through the contact hole 94.

An etching region 96 represents a region which is etched as a sacrificial layer among the insulation films, not shown, and when etching of the sacrificial layer is carried out, the movable electrode (poly-Si) 76 is fixed at two ends and the electrode portions 74, 75 become a movable structure.

Since the mass portion 73 is disposed in this embodiment, the displacement of the movable electrodes can be made greater than in the second embodiment, and the detection sensitivity can be improved.

EXAMPLE 4

The fourth embodiment of the first aspect of the present invention will be explained.

Figure 20:
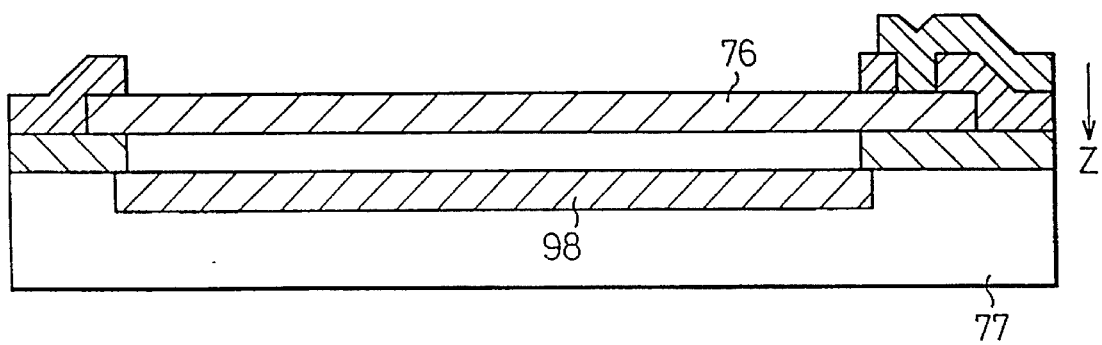
FIG. 20 is a sectional view showing a semiconductor accelerometer according to the fourth embodiment of the present invention.

FIG. 20 is a sectional view of the accelerometer according to this embodiment.

In the first example shown in FIG. 1, the second example shown in FIG. 14 and the third example shown in FIG. 18, a voltage difference also occurs in the beam and in the mass portion with respect to the substrate besides the movable electrode(s) functioning as the electrodes. For this reason, the force of static electricity unavoidably occurs. When this force of static electricity is estimated, it is 1,771N per square meter when the voltage difference is 10 V between the movable electrode and the substrate and the gap between them is 0.5 μm. Assuming that the movable electrode is made of a 1 μm-thick poly-Si, this value is approximately 80,000 times the force of acceleration of 1 G. Accordingly, since the movable electrode is attracted to the substrate by a very large force, the beam structure must be stiff enough to stop the beam from coming into contact with the substrate. However, such a stiff structure remarkably reduces the displacement of the beam, that is, the movable electrode, when it receives acceleration, and makes it difficult to detect acceleration. The occurrence of static electricity must be reduced in order to reduce any influences from the static electricity.

Therefore, as shown in FIG. 20, the lower electrode 98 intended to keep an equal potential to that of the movable electrode 76 is disposed at a silicon substrate 77, which does not function as the movable electrode such as the beam and the mass portion. This lower electrode 98 is electrically insulated from the fixed portions 78 to 81 and is disposed on the silicon substrate 77 opposing the portion not having the electrode function (the portion devoid of the fixed electrodes on the lower substrate) among the movable electrode (poly-Si) 76. The lower electrode 98 is formed simultaneously with the formation of the diffusion layer for wiring. When acceleration is detected, the lower electrode 98 and the movable electrode 76 are electrically connected and set to an equal potential by an external switch, not shown in the drawing. In this way, the region in which the force of static electricity occurs can be reduced to minimum.

Figure 21:
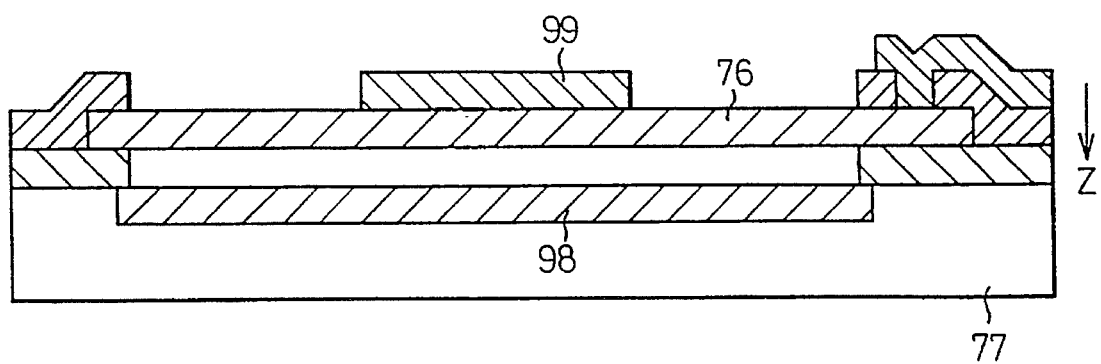
FIG. 21 is a sectional view showing an application example of the fourth embodiment.

Further, in order to secure a large displacement quantity of the movable portion, a metal having a large specific gravity such as Au, W, etc, may be added to the mass portion, as shown in FIG. 21.

EXAMPLE 5

Next, the fifth embodiment of the first aspect of the present invention will be explained.

In the fourth example described above, the lower electrode 98 is disposed and its potential is set equal to the potential of the movable electrode 76 so as to restrict the generation of the force of static electricity. In this embodiment, a potential difference is provided between the lower electrode 98 and the movable electrode 76 and the force of static electricity is generated. Accordingly, displacement occurs in the movable electrode 76 and virtual acceleration develops. In this way, the sensor function can be easily checked. At the same time, when the movable portion receives acceleration during the sensor operation and undergoes displacement in the Z direction shown in FIG. 20 to thereby change the current between the fixed electrodes, the potential difference between the movable electrode 76 and the lower electrode 98 is reduced so as to return the current to the original current value. In this way, the force of static electricity becomes small, and the movable electrode 76 undergoes displacement in the opposite direction to the Z direction and returns to the original position. When the force of static electricity (the potential difference between the movable electrode 76 and the lower electrode 98) is regulated in such a manner that the current value between the fixed electrodes becomes always constant, the displacement quantity of the movable electrode 76 when it receives acceleration can be made extremely small, and impact resistance can be drastically improved. In this case, acceleration may be detected as a voltage change between the movable electrode 76 and the lower electrode 98.

EXAMPLE 6

Next, the sixth embodiment of the first aspect of the present invention will be explained.

Figure 22:
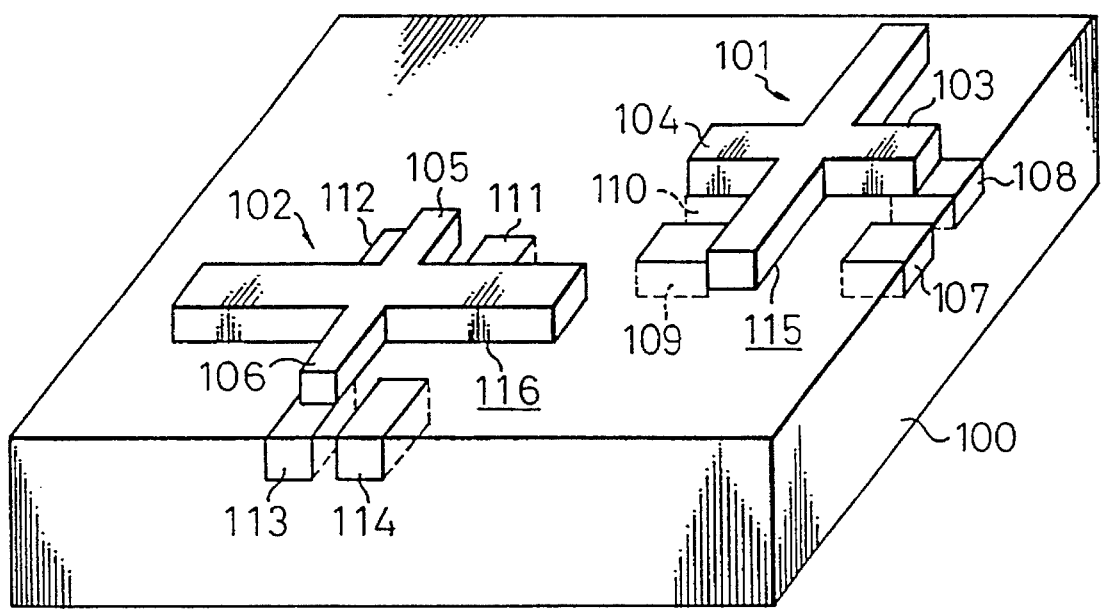
FIG. 22 is a sectional view showing a semiconductor accelerometer according to the sixth embodiment of the present invention.

FIG. 22 is a perspective view of the accelerometer of this sixth Example.

This embodiment provides a three axis transistor type semiconductor accelerometer for detecting acceleration in three dimensions. A sensor portion 101 is disposed on a silicon substrate 100 in such a fashion that the longitudinal direction of its beam extends in the Y direction in the drawing. A sensor portion 102 is disposed on the silicon substrate 100 in such a fashion that the longitudinal direction of its beam extends in the X direction in the drawing.

In other words, there are disposed a movable electrode 115 having electrodes 103 and 104 and a movable electrode 116 having electrodes 105 and 106, and there are also formed fixed electrodes 107 to 114. Other lower electrodes, insulating layers, aluminum wirings, contact holes, and so forth, are omitted from the drawing. As already described, the sensor portion 101 can detect acceleration in the X and Z directions by the increase and decrease of the current quantities between the electrodes 107 and 108 and between 109 and 110. Further, the sensor portion 102 can detect acceleration in the Y and Z directions by the increase and decrease of the current values between the electrodes 111 and 112 and between 113 and 114.

Accordingly, two transistor type semiconductor accelerometers of Examples 2 to 5 are so disposed on the same silicon substrate as to orthogonally cross each other and in this way, a three axis accelerometer can be accomplished. In other words, acceleration can be detected in three dimensionals on one silicon chip.

EXAMPLE 7

The seventh embodiment of the first aspect of the present invention described above will be explained in further detail as Example 7.

Figure 23:
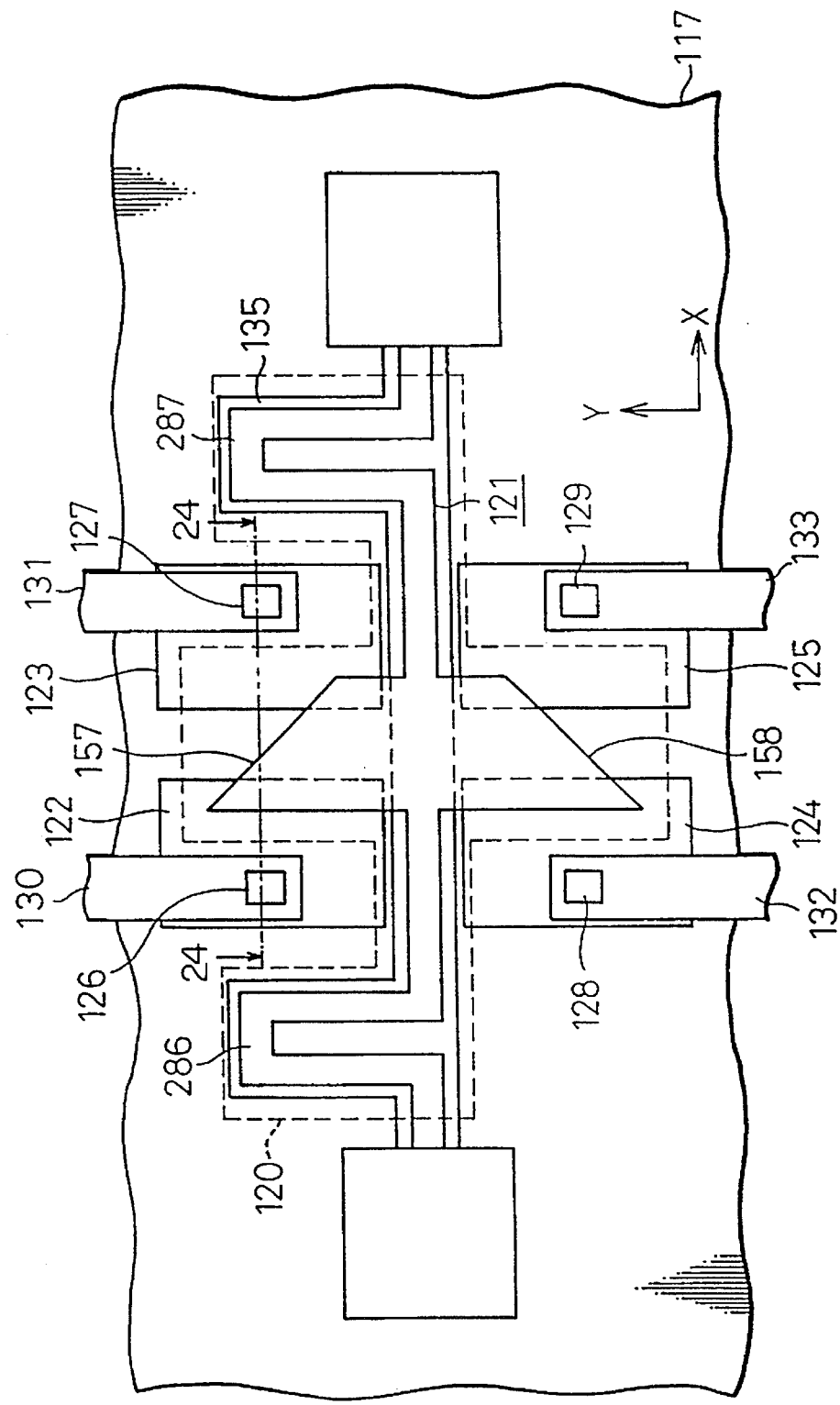
FIG. 23 is a plan view showing a semiconductor accelerometer according to the seventh embodiment of the present invention.
Figure 24:
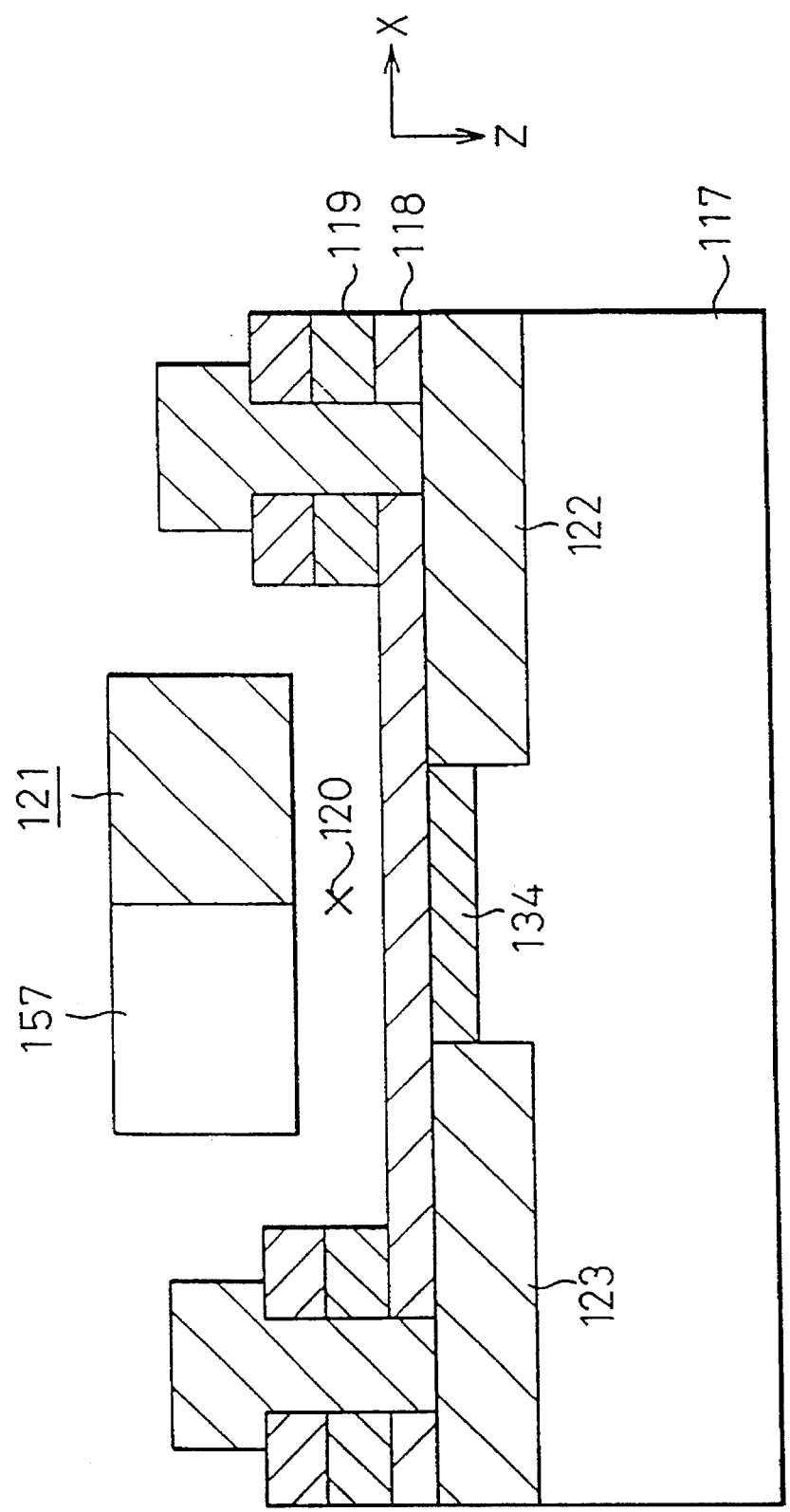
FIG. 24 is a sectional view taken along a line 24—24 of FIG. 23.

FIG. 23 is a plan view of the semiconductor accelerometer of this Example 7 and FIG. 24 is a sectional view taken along a line 24—24 of FIG. 23.

As shown in FIG. 24, an insulating film 118 is formed throughout the entire surface of a main plane of a P-type silicon substrate 117, and an insulating film 119 is formed on this insulating film 118. The insulating film 118 is to serve as a gate insulating film of a transistor, reduces a leakage current on the surface of the substrate and restricts the deterioration of transistor characteristics with age. The insulating films 118 and 119 are made of $SiO_2$, $Si_3N_4$, etc. A region devoid of the insulating film 119, that is, a gap portion 120, is formed on the P-type silicon substrate 117 (see FIG. 23). A movable electrode 121 having a double support structure is disposed on the insulating film 119 in such a manner as to bridge over the gap portion 120. This movable electrode 121 is made of poly-Si, and functions as a gate electrode of an MISFET. Here, the movable electrode 121 has electrode portions 157, 158 protruding in the Y direction in FIG. 23, and the distal end of each electrode portion 157, 158 is shaped obliquely. Since the electrode portions 157, 158 are thus shaped obliquely, acceleration in the biaxial directions inside the substrate plane can be detected (the detail of the operation will be described later). U-shaped portions 286 and 287 are formed in the movable electrode 121, and the movable electrode 121 is allowed to move in the biaxial direction horizontal to the substrate 117 (in the X and Y directions in FIG. 23).

By the way, the gap portion 120 of the insulating film 119 below the movable electrode 121 is formed by etching as a sacrificial layer. When etching of this sacrificial layer is carried out, an etching solution which does not etch the insulating film 118 for protecting the movable electrode 121 and the substrate surface but etches the insulating layer 119 as the sacrificial layer is used. For example, an HF solution system can be used as the etching solution when a $Si_3N_4$ film is used for the insulating film 118 and a $SiO_2$ film is used for the insulating film 119.

Fixed electrodes 122 to 125 consisting of an impurity diffusion layer are formed on the P-type silicon substrate 117. They are formed by introducing an N-type impurity into the P-type silicon substrate 117 by ion implantation or like means.

Besides poly-Si, a refractory metal such as tungsten may also be used for the movable electrode (doubly-supported beam) 121.

The fixed electrodes 122 to 125 are electrically connected to aluminum wiring 130 to 133 through contact holes 126 to 129, respectively. The aluminum wiring 130 to 133 is connected to an external electronic circuit.

The fixed electrodes 122, 123 or 124, 125, the movable electrode 121, the gate insulating film 118 and the gap portion 120 together constitute the field effect transistor (MISFET).

Accordingly, when a voltage is impressed on the movable gate electrode 121, an inversion layer 134 is formed between the fixed electrodes 122, 123 or 124, 125 on the P-type silicon substrate 117, and a drain current flows through the fixed electrodes 122, 123 or 124, 125.

As also shown in FIG. 23, a lower electrode 135 is disposed on the P-type silicon substrate 117 opposing the region (the beam portion) of the movable electrode 121 other than the electrode portions 157, 158. This lower electrode 135 keeps the potential at a level equal to that of the movable electrode 121 and restricts the generation of the force of static electricity.

Next, the production steps of the semiconductor accelerometer having such a construction will be explained with reference to FIGS. 25 to 33.

Figure 25:
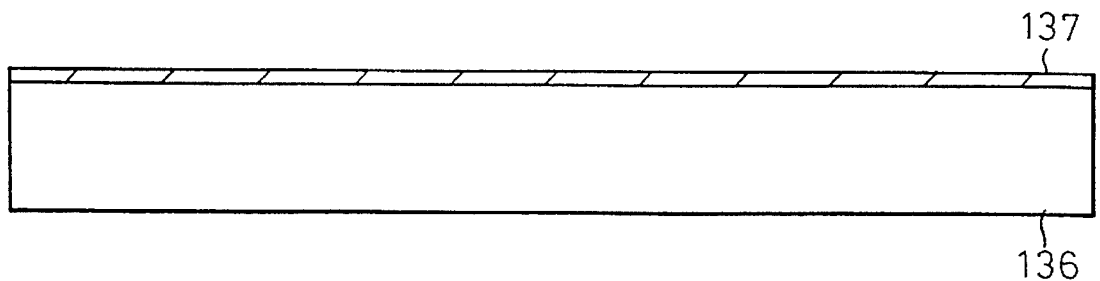
FIG. 25 through FIG. 33 are sectional views showing the production steps of the semiconductor accelerometer.

As shown in FIG. 25, a P-type silicon substrate 136 is first prepared, and a gate insulating film 137 is formed by CVD (Chemical Vapor Deposition), etc. This insulating film is not etched by an etching solution for etching a sacrificial layer.

Figure 26:
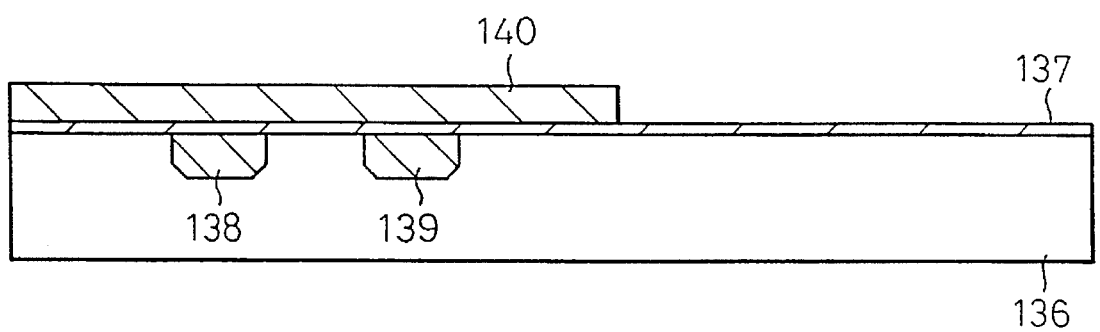

Next, as shown in FIG. 26, fixed electrodes 138, 139 of a sensor consisting of an N-type diffusion layer are formed by a photolithographic process, ion implantation, etc, and after an insulating film 140 is formed, a part of which is to function as the sacrificial layer, a transistor formation region in a circuit portion is etched and removed through a photolithographic process.

Figure 27:
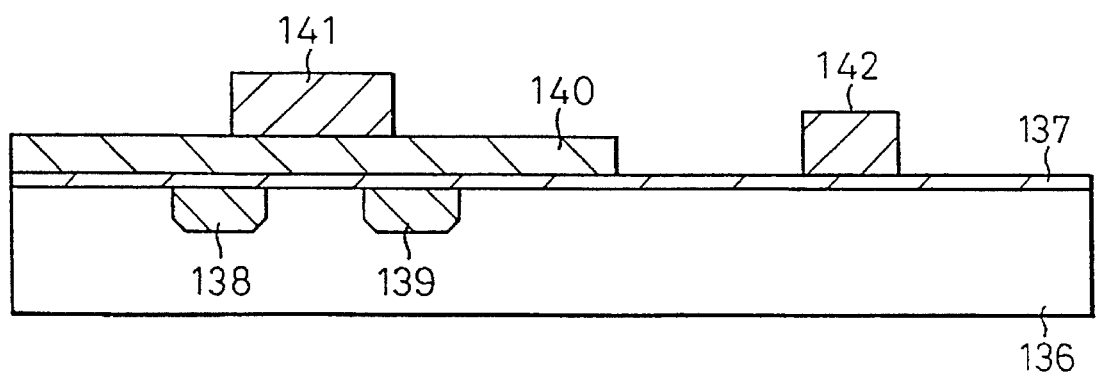

Further, as shown in FIG. 27, a poly-Si film is formed, and a movable gate electrode 141 and a gate electrode 142 of the transistor of the circuit portion are formed by drying etching, etc, through the photolithographic process.

Figure 28:
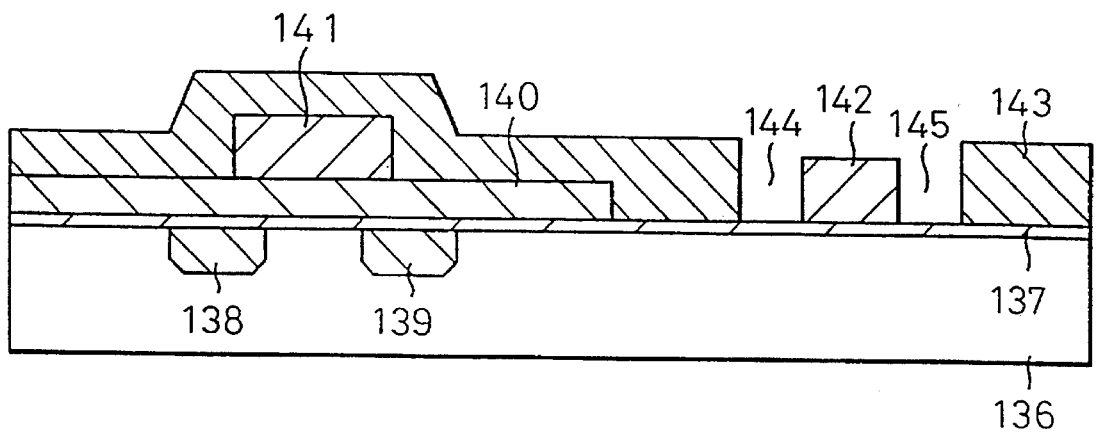

Subsequently, as shown in FIG. 28, openings 144, 145 are formed on both sides of the gate electrode 142 using a photoresist 143 through the photolithographic process in order to form the source-drain region of the transistor of the circuit portion consisting of the N-type diffusion layer.

Figure 29:
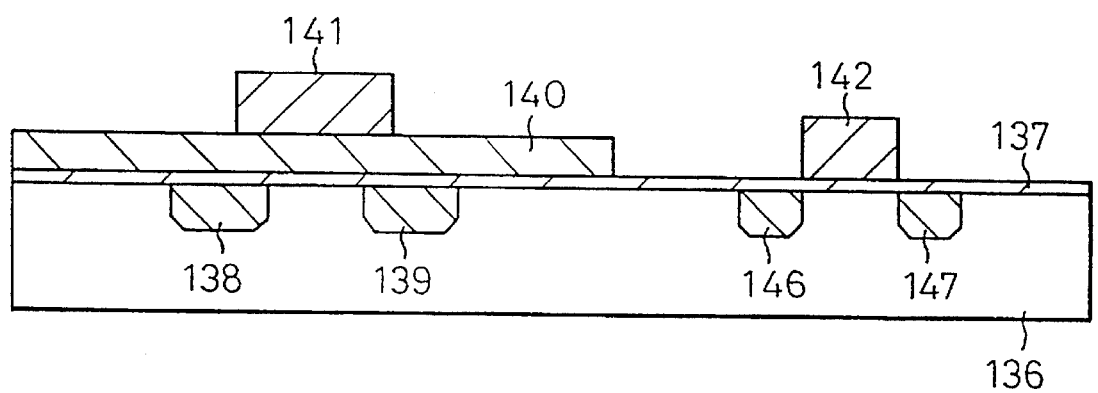

Next, an impurity is introduced by ion implantation, etc, through the openings 144, 145 on both sides of the gate electrode 142 in self-alignment with the gate electrode 142. In this way, the source-drain regions 146, 147 of the transistor consisting of the N-type diffusion layer are formed as shown in FIG. 29.

Figure 30:
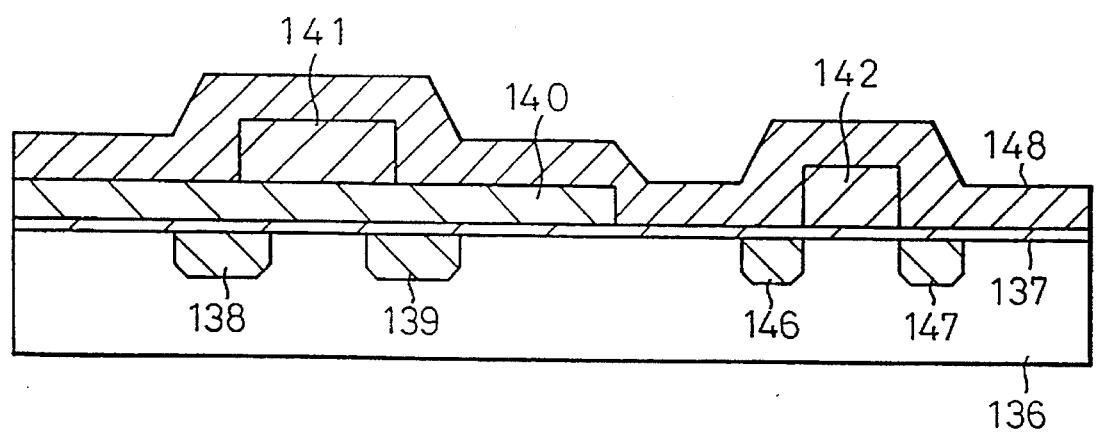
Figure 31:
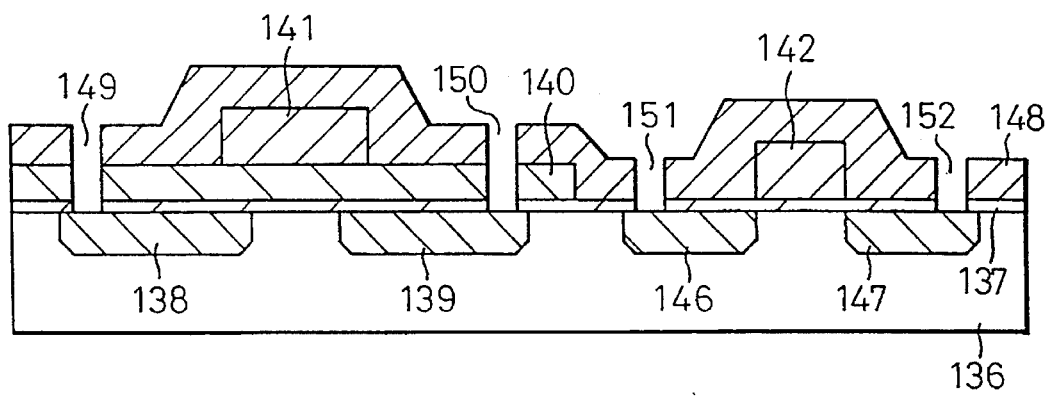

Next, an inter-layer insulating film 148 is formed as shown in FIG. 30 in order to electrically isolate the movable electrode 141, the gate electrode 142, the fixed electrodes 138, 139 and the source-drain regions 146, 147 from the aluminum wiring. As shown in FIG. 31, contact holes 149 to 152 are bored in the inter-layer insulating film 148 by the photolithographic process so as to electrically connect the fixed electrodes 138, 139 and the source-drain regions 146, 147 to the aluminum wiring.

Figure 32:
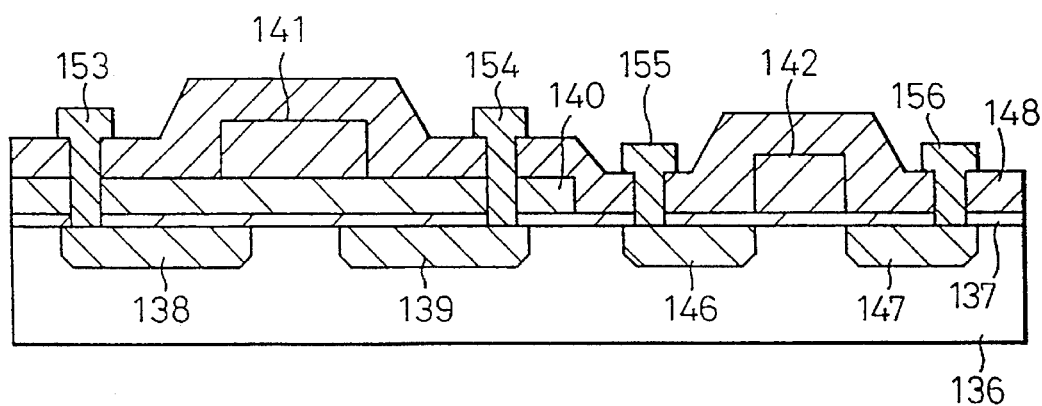
Figure 33:
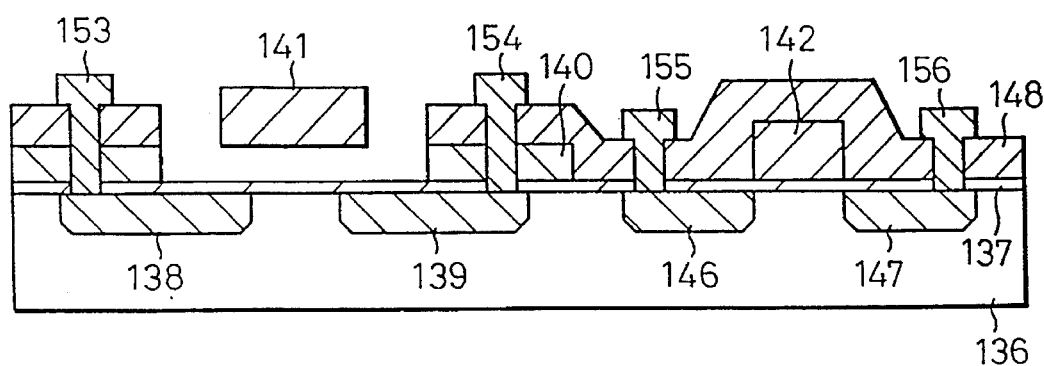

Furthermore, as shown in FIG. 32, a film of aluminum as the electrode material is formed to constitute the aluminum wiring 153 to 156 through the photolithographic process. A sacrificial layer as a part of the interlayer insulating film 148 and as a part of the insulating film 140 is etched as shown in FIG. 33.

In this way, the manufacturing process of the transistor type semiconductor accelerometer are completed.

Next, the operation of the semiconductor accelerometer will be explained with reference to FIGS. 23 and 24.

The movable electrode 121, the gap portion 120, the gate insulating film 118 and the fixed electrodes 123 to 125 constitute the field effect transistor.

The drain current Id of the field effect transistor is expressed by the following formula:

$$Id = \frac{W \cdot \mu \cdot C_i}{2L} (V_g - V_{th})^2 \quad (1)$$

Here, $\mu$ represents carrier mobility, and L, W and $V_{th}$ represent a channel length, a channel width and a threshold voltage of the field effect transistor, respectively. $V_g$ represents the gate voltage, and $C_i$ is an capacitance constituted by the movable electrode (gate electrode) 121, the gap portion 120, the gate insulating film 118 and the P-type silicon substrate 117. It is a composite capacitance formed by connecting a capacitance Cox formed by the gate insulation film and a capacitance Cgap formed by the gap, in series with each other, and is expressed by the following formula:

$$C_i = \frac{Cox \cdot Cgap}{Cox + Cgap} \quad (2)$$

The operation of the accelerometer capable of two-dimensional detection inside the substrate plane will be explained with reference to FIGS. 23, 34, 35 and 36. Note that FIG. 34 is a partial enlarged view of the transistor portion of FIG. 23.

Figure 34:
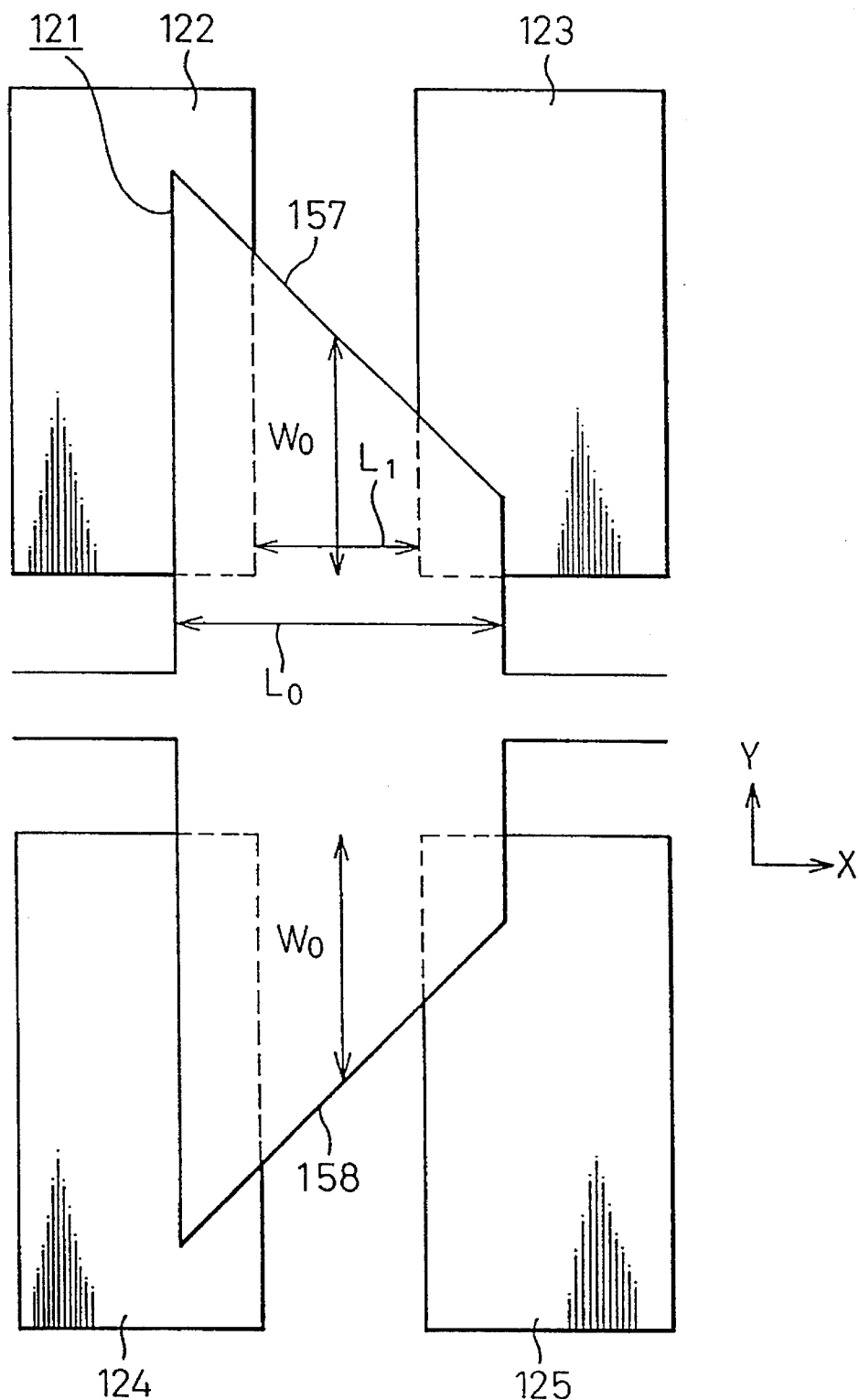
FIG. 34 is a partial enlarged view of the semiconductor accelerometer.
Figure 35:
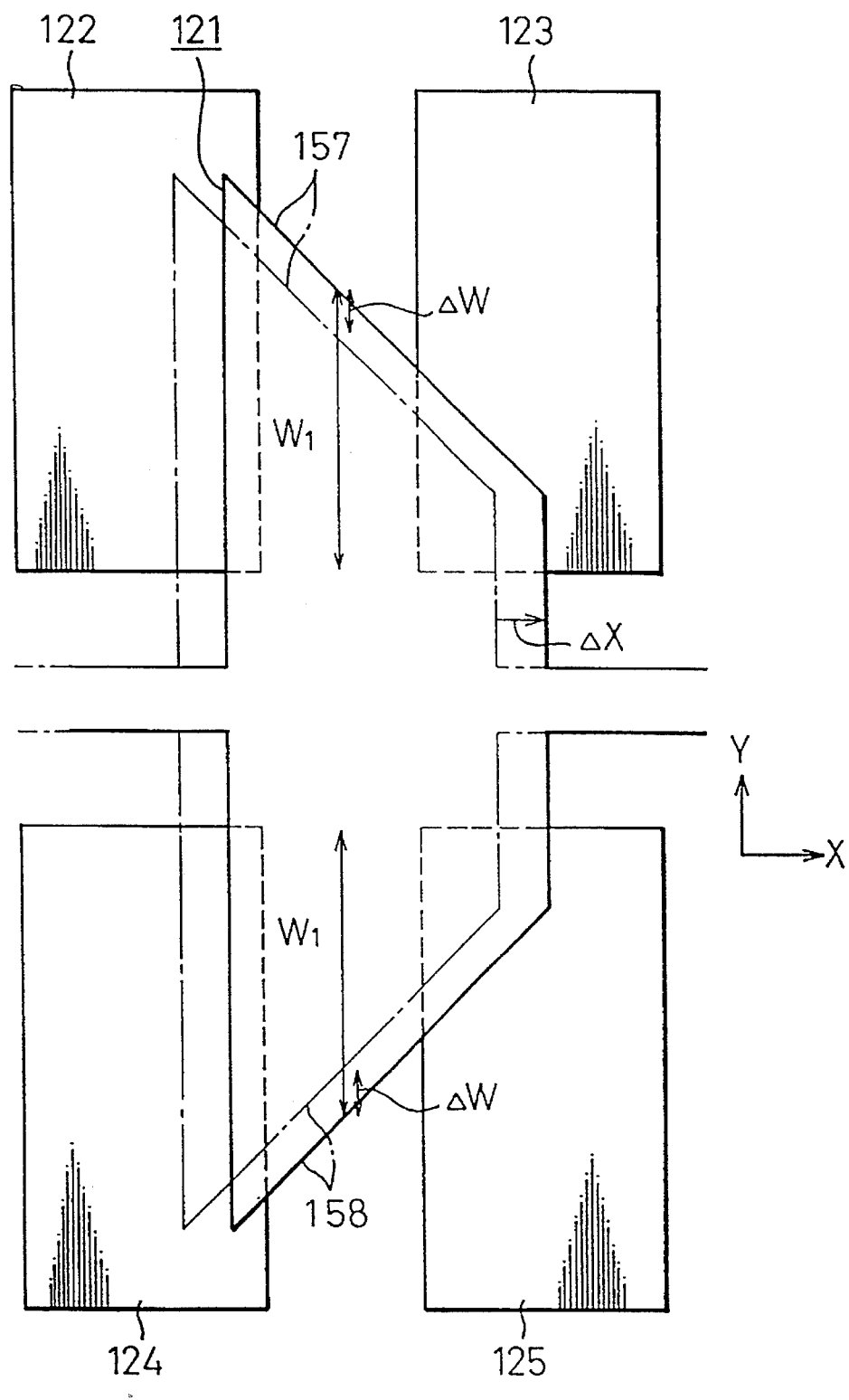
FIG. 35 is a plan view useful for explaining the operation of the semiconductor accelerometer.

In FIG. 34, the distal end of each of the electrode portions 157, 158 of the movable electrode 121 is shaped obliquely, and has a width Wo of the inversion layer region between both fixed electrodes (source-drain diffusion layer) 122, 123 and 124, 125.

When this semiconductor accelerometer is accelerated and the movable electrode 121 undergoes displacement in the X direction (in the horizontal direction of the substrate) shown in FIG. 34, the area of the inversion layer region formed by the electrode portion 157 of the movable electrode 121 and the fixed electrodes 122, 123 and the area of the inversion layer region formed by the electrode portion 158 of the movable electrode 121 and the fixed electrodes 124, 125 both increase, and the gate width Wo in the case of the field effect transistor increases by ΔW to W1. Accordingly, the drain current flowing between the source (the fixed electrode 122) and the drain (the fixed electrode 123) and between the source (the fixed electrode 124) and the drain (the fixed electrode 125) increases.

Figure 36:
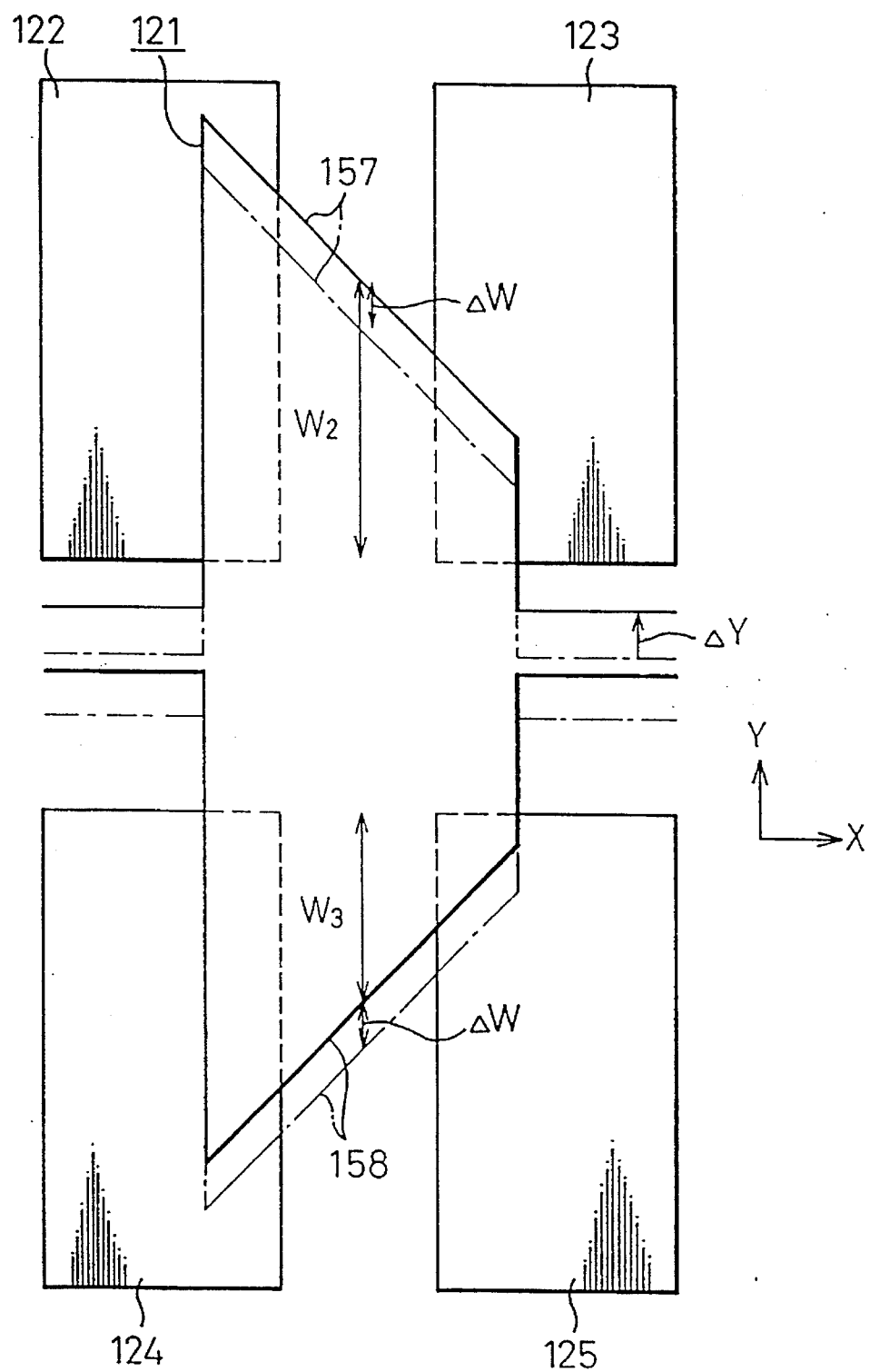
FIG. 36 is also a plan view useful for explaining the operation of the semiconductor accelerometer.

When the semiconductor accelerometer is accelerated and the electrode portions 157, 158 of the movable electrode 121 undergo displacement in the Y direction shown in FIG. 34, the area of the inversion layer region formed by the electrode portion 157 and the fixed electrodes 122, 123 increases as shown in FIG. 36, and the gate width Wo in the case of the field effect transistor increases by ΔW to W2. Accordingly, the current flowing between the fixed electrodes 122 and 123 increases. The area of the inversion layer region formed by the electrode portion 158 of the movable electrode 121 and the fixed electrodes 124, 125 decreases, and the gate width Wo in the case of the field effect transistor decreases by $\Delta W$ to W3. Accordingly, the current flowing between the fixed electrodes 124 and 25 decreases.

The length of each of the source-drain diffusion layers may be set to be sufficiently greater than the change in the X and Y directions against acceleration in order to provide linearity to the change of the drain current resulting from the change of the gate width. The change of the drain current in each field effect transistor, inclusive of the case where displacement occurs oppositely in X and Y directions, is tabulated in Table 1.

TABLE 1

|  | change of drain current | |
| --- | --- | --- |
|  | gate (157) side | gate (158) side |
| +X direction | increase | increase |
| −X direction | decrease | decrease |
| +Y direction | increase | decrease |
| −Y direction | decrease | increase |

As tabulated in Table 1, when displacement occurs in the X and Y directions, biaxial acceleration, that is, in the X and Y directions, can be detected by the combination of the changes of the drain currents on the electrode 157 side and the electrode 158 side of the movable electrode 121.

Figure 37:
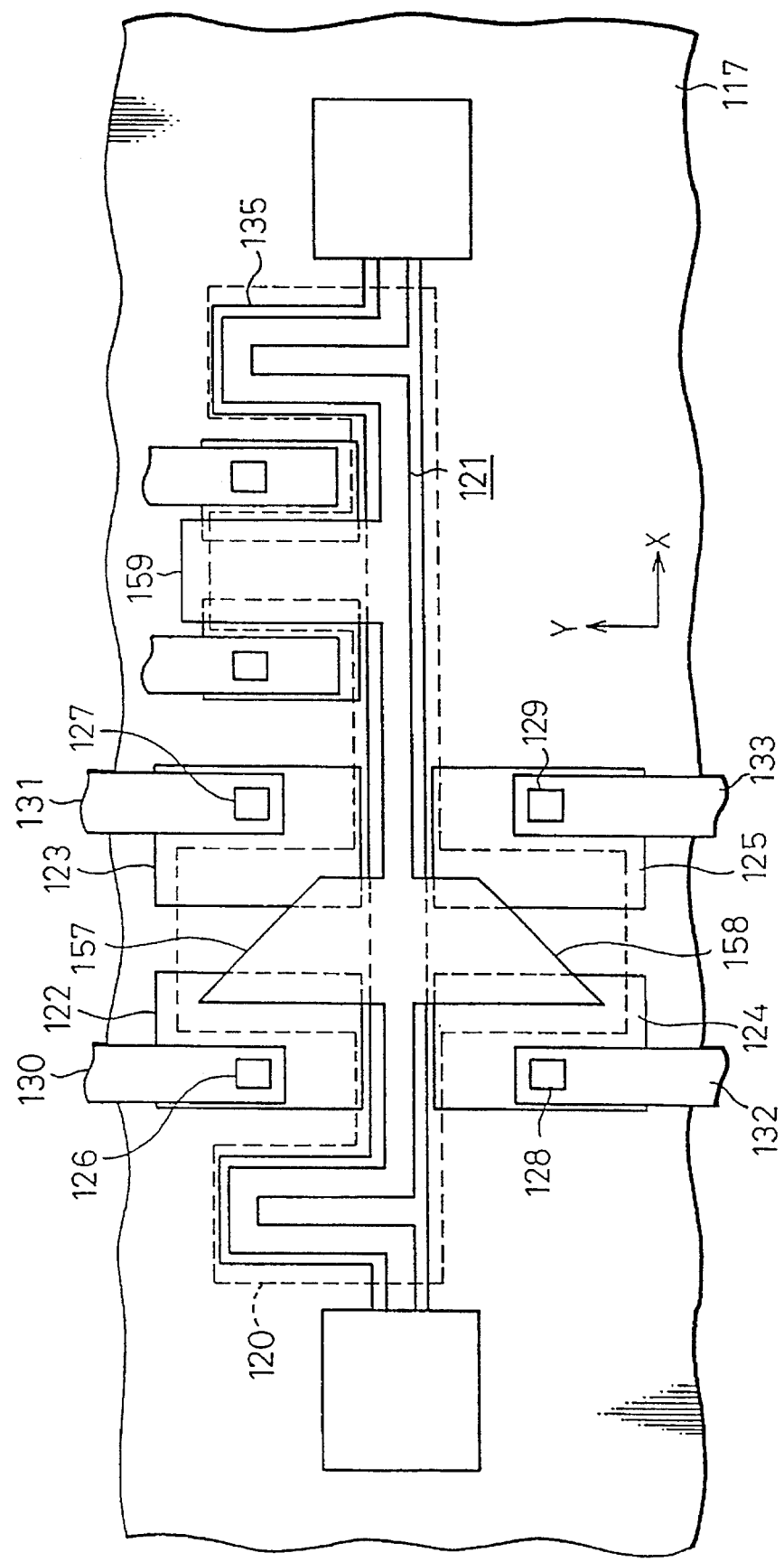
FIG. 37 is a plan view showing the semiconductor accelerometer.

Next, we will consider the case where the semiconductor accelerometer receives acceleration and the movable electrode 121 undergoes displacement in the Z direction in FIG. 24. In this case, the electrostatic capacitance Cgap formed by the movable electrode 121 and the semiconductor substrate increases, and $C_i$ increases in accordance with the formula (2). Accordingly, the drain current of the transistor type accelerometer increases in accordance with the formula (1). In this way, displacement in the Z direction can be detected. Accordingly, acceleration in the X, Y and Z directions can be detected by adding one each of the X and Y gate electrodes (the electrode portion 159 and the fixed electrodes corresponding to the former) to the accelerometer capable of detection in the X and Y directions shown in FIG. 23, as shown in FIG. 37. This electrode portion 121 sufficiently superposes with the fixed electrodes therebelow, and the area of the inversion layer region does not change even when the movable electrode 121 undergoes in the X and Y directions in FIG. 37.

The change of the drain current in each field effect transistor at this time is tabulated in Table 2.

TABLE 2

|  | change of drain current | | |
| --- | --- | --- | --- |
|  | gate 157 side | gate 158 side | gate 159 side |
| +X direction | increase | increase | no change |
| −X direction | decrease | decrease | no change |
| +Y direction | increase | decrease | no change |
| −Y direction | decrease | increase | no change |
| +Z direction | increase | increase | increase |
| −Z direction | decrease | decrease | decrease |

As tabulated in Table 2, when displacement occurs in the X, Y and Z directions, acceleration of the three axes of X, Y and Z can be detected by one accelerometer by the combination of the change of the drain currents on the gate (the electrode portion 157 of the movable electrode 121) side, the gate (the electrode portion 158 of the movable electrode 121) side and the gate (the electrode portion 159 of the movable electrode 121) side.

As an application of this embodiment, the gate electrode (the electrode portion 159 of the movable gate electrode 121) added in FIG. 37 has the distal end which is not machined lest the gate width changes with the displacement in the X and Y directions. However, the gate electrode having the distal end which is obliquely machined may also be used, as previously described. Though this embodiment uses the doubly-supported beam, the beam may also be a cantilever. Further, the current to be detected in this embodiment can be the drain current in the saturation region of the formula (1), but the drain current in the linear region may also be used for detection.

As described above, in this Example, the movable electrode 121 is allowed to move in horizontal biaxial direction with respect to the P-type silicon substrate 117, the electrode portions 157 and 158 extending in the mutually opposite directions are provided to the movable electrode 121 and these electrode portions 157, 158 are obliquely shaped in such a manner as to incline from one of the fixed electrodes to the other with respect to the portion positioned above and between both fixed electrodes. Accordingly, the movement of the movable electrode 121 in the horizontal biaxial direction with respect to the substrate can be detected.

EXAMPLE 8

The eighth embodiment of the first aspect of the present invention will be explained.

Figure 38:
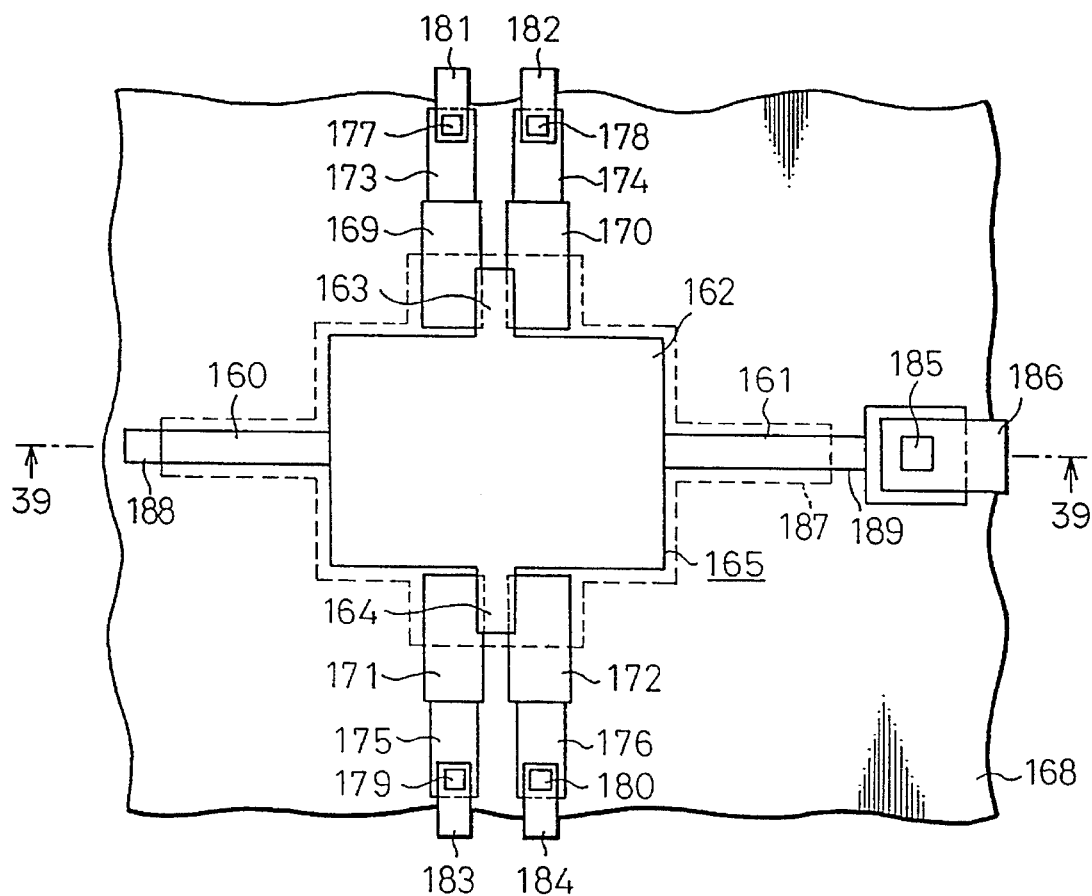
FIG. 38 is a plan view of a semiconductor accelerometer according to the eighth embodiment of the present invention.
Figure 39:
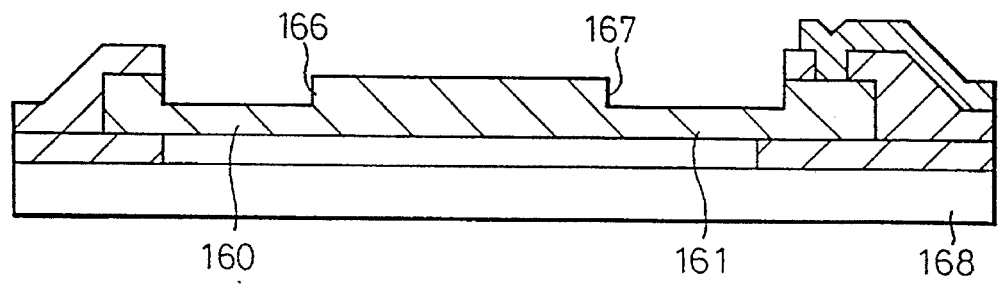
FIG. 39 is a sectional view taken along a line 39—39 of FIG. 38.

FIG. 38 is a plan view of the semiconductor accelerometer of this Example 8 and FIG. 39 is a sectional view taken along a line 39—39 of FIG. 38.

In the first Example shown in FIG. 1, one doubly-supported beam functions as the flexible member, the weight and the electrode, and in the second Example shown in FIG. 14, one doubly-supported beam functions as the flexible member and the weight and one pair of electrode portions function as the weight and the electrodes. In the third Example shown in FIG. 18, the movable electrode made of poly-Si is constituted by two beam portions having the function of the flexible member, the mass portion having the function of the weight and the electrode portions having the functions of the electrodes.

In this Example 8, a movable electrode 165 made of poly-Si is constituted by two beam portions 160, 161 having the function of the flexible member in the same way as in the third Example, a mass portion 162 having the function as the weight and electrode portions 163, 164 having the function of the electrodes. A recess 166, 167 is formed in each of the two beam portions 160, 161 having the function as the flexible member as shown in FIG. 39, and the thickness of each beam portion 160, 161 is thus reduced. Since the thickness of the beam portions 160, 161 is thus reduced, their function as the flexible member can be further improved. In this Example, too, fixed electrodes 169 to 172 consisting of an N-type diffusion layer are formed on both sides of a P-type silicon substrate 168 below the electrode portions 163, 164. These fixed electrodes (diffusion layers) are electrically connected to diffusion layers 173 to 176 for wiring, respectively, and are further connected to aluminum wiring 181 to 184 through contact holes 177 to 180, respectively.

The movable electrode (poly-Si) 165 is connected to the aluminum wiring 186 through the contact hole 185.

An etching region 187 represents a region which is to be etched as a sacrificial layer among the insulating film, and when etching of the sacrificial layer is carried out, the movable electrode (poly-Si) 165 is fixed at two fixing ends 188, 189, whereby the electrode portions 163, 164 become a movable structure.

As described above, in this Example, the beam portions 160, 161 as a part of the movable electrode 165 have a reduced thickness structure. Accordingly, the spring constant of the beam portions 160, 161 becomes smaller than in the third Example, and displacement of the movable electrode 165 can be made greater. Accordingly, the detection sensitivity can be improved.

EXAMPLE 9

The ninth embodiment of the first aspect of the present invention will be explained as Example 9.

Figure 40:
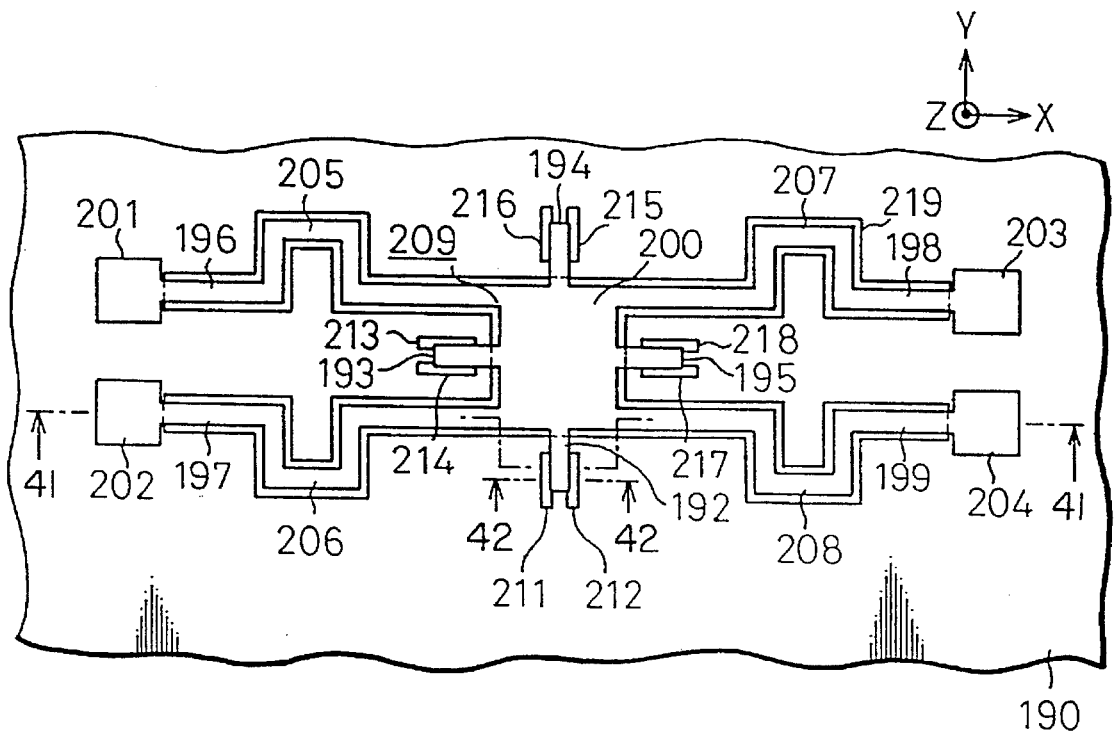
FIG. 40 is a plan view of a semiconductor accelerometer according to the ninth embodiment of the present invention.

FIG. 40 shows the overall structure of the field effect transistor type three-dimensional accelerometer (hereinafter referred to as the "semiconductor accelerometer") according to this Example.

Figure 41:
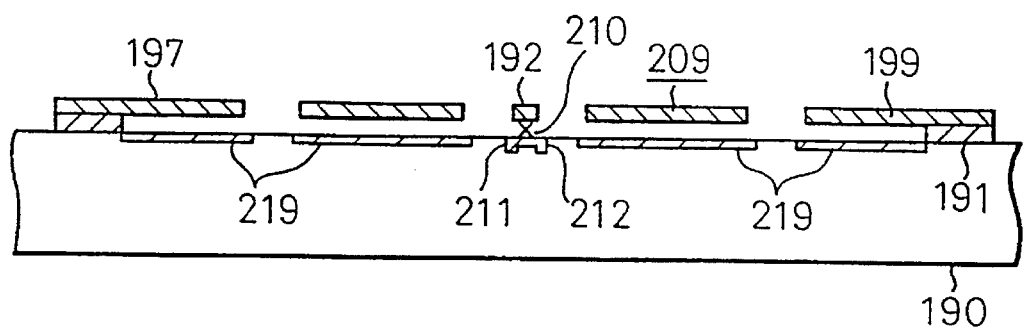
FIG. 41 is a sectional view taken along a line 41—41 of FIG. 40.
Figure 42:
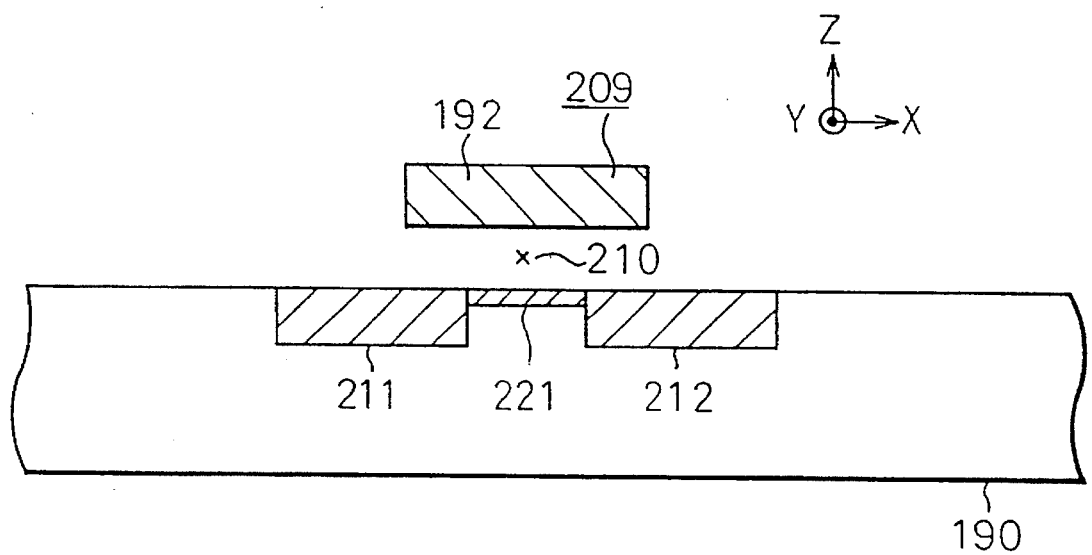
FIG. 42 is also a sectional view taken along a line 42—42 of FIG. 40.

FIG. 41 is a sectional view taken along a line 41—41 of FIG. 40, and FIG. 42 is also a sectional view taken along a line 42—42 of FIG. 40.

The semiconductor accelerometer shown in FIGS. 40 to 42 is produced by the following process.

First of all, an insulating film 191 made of $SiO_2$, $Si_3N_4$, etc, is formed on a silicon substrate 190, and a film made of poly-Si, an oxide or another metallic material, is formed on the insulating film 191. This film on the insulating film 191 is formed on a movable electrode 209 having a double-support structure and comprising gate electrode portions 192 to 195 corresponding to the gate of a field-effect transistor, beam portions 196 to 199, a mass portion 200, anchor portions 201 to 204 and U-shaped portions 205 to 208, by a wet or dry process. The insulating film 191 is etched in such a manner as to leave the lower portion of the anchor portions 201 to 204 disposed at the end portion of the movable electrode 209 as shown in FIGS. 41 and 42. Accordingly, a gap 210 is thereby formed, and the movable electrode 209 assumes a bridge structure above the insulating film 191. This etching is called "sacrificial layer etching", and an etching solution which does not etch the movable electrode 209 but selectively etches the insulating film as the sacrificial layer formed below the movable electrode 209 is used.

As shown in FIGS. 40 and 42, fixed electrodes 211 to 218 corresponding to the sources and drains of field effect transistors and consisting of an impurity diffusion layer are formed in the silicon substrate 190. Accordingly, the gate electrode portion 192 and the fixed electrodes 211, 212, the gate electrode portion 193 and the fixed electrodes 213, 214, the gate electrode portion 194 and the fixed electrodes 215, 216, and the gate electrode portion 195 and the fixed electrode portions 217, 218 function as the acceleration detection portions, respectively.

As also shown in FIGS. 40 and 41, a lower electrode 219 is disposed on the silicon substrate 190 opposing the beam portion of the movable electrode 209 (the beam portions 196 to 199 and the bent portions 205 to 208). This lower electrode 219 is disposed so as to set a potential to the equal potential to the movable electrode 209 and to restrict the occurrence of the force of static electricity.

Such a semiconductor accelerometer is produced by an IC fabrication process or the application of such a process. Therefore, the sensor structure can be formed during the IC fabrication process, and integration with the circuit becomes extremely easy.

The semiconductor accelerometer produced in the manner described above has the following construction.

In other words, the gate electrode portions 192, 194 and 193, 195 at the acceleration detection portions of the movable electrode 209 are so disposed as to cross mutually orthogonally with the mass portion 20 being the center as shown in FIG. 40, and the mass portion 200 is connected to the anchor portions 201 to 204 through the four beams as shown in FIG. 40. These anchor portions 201 to 204 are connected to an external electronic circuit by aluminum wiring, not shown in the drawings. The U-shaped portions 205 to 208 are provided to the intermediate portion of the beam portions 196 to 199, respectively, so as to provide three-dimensional freedom to the mass portion 200. Accordingly, even one element (device) can have freedom in the X, Y and Z directions, and three axis detection of acceleration is possible.

Therefore, the semiconductor accelerometer having the construction shown in FIG. 40 operates in the following way. When acceleration in the horizontal direction (the X and Y-axis directions) acts on this semiconductor accelerometer with respect to the beam portions 196 to 199, the mass portion 200 receives the force due to this acceleration in the horizontal direction, and displacement develops. The change of the areas of the inversion layer regions between two sets of the gate electrode portion 192 (the fixed electrodes 211, 212) and the gate electrode portion 194 (the fixed electrodes 215, 216), and between the gate electrode portion 193 (the fixed electrodes 213, 214) and the gate electrode portion 195 (the fixed electrodes 217, 218) results in a change in the gate width in each of the respective acceleration detection portion. As a result, acceleration in the horizontal direction that acts on the semiconductor accelerometer can be detected as the change of the drain currents of the field effect transistors. Similarly, when the mass portion 200 receives acceleration in the vertical direction (in the Z axis direction) with respect to the beam portions 196 to 199 and undergoes displacement, the gaps 210 between each one of the two sets of the gate electrodes 192, 194 and 193, 195 of the acceleration detection portion, and the silicon substrate 190 change, respectively, so that the field intensity changes. As a result, acceleration in the vertical direction that acts on the semiconductor accelerometer is detected as the change of the drain currents of the field effect transistors. The changes in the drain currents thus detected are applied to, and processed by, an external circuit as electric signals through the aluminum wirings, not shown, and in this way, three axis acceleration can be detected by one element (device).

In other words, when the acceleration detection portions are arranged as shown in FIG. 40, three axis acceleration can be detected by one element.

Theoretical analysis of detecting of three axis acceleration which has been described in detail will now be explained with reference to FIG. 43.

The drain current Id flowing through the acceleration detection portion consistituted by the field effect transistor changes in accordance with the formula (1) given already.

Figure 43:
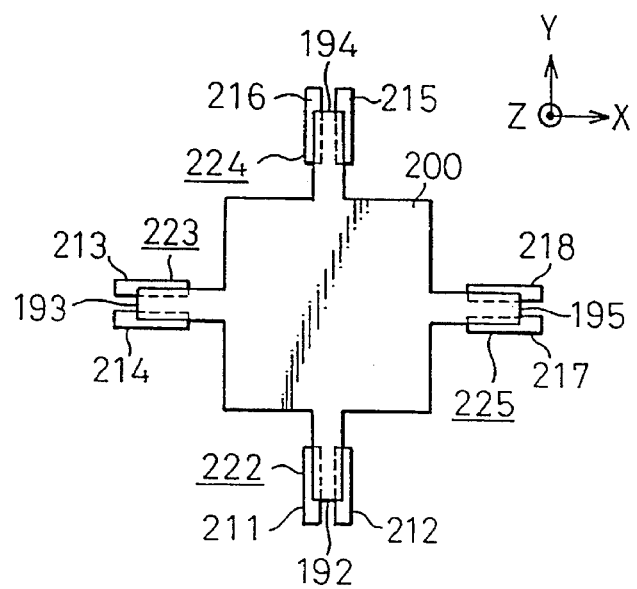
FIG. 43 is a plan view useful for explaining the operation of the semiconductor accelerometer.

When acceleration acts on the semiconductor accelerometer of this Example and the mass portion 200 undergoes displacement in the X, Y and Z directions shown in FIG. 43, the drain currents Id1, Id3, Id2 and Id4 flowing between two sets of fixed electrodes 211, 212, between the fixed electrodes 215, 216 and between the fixed electrodes 213, 214 and between the fixed electrodes 217, 218, that are so disposed as to cross mutually orthogonally one another, are expressed by the following formula, by the displacement Wgx, Wgy of the gate width of the acceleration detection portion due to acceleration gx and gy in the X and Y directions, respectively, and by the changing gap 210 (g=gz) between the two sets of the gate electrode portions 192, 194 and 193, 195 and the silicon substrate 190:

$$Id1 = (W - Wgy) \alpha \ (g=gz)$$

$$Id2 = (W - Wgx) \alpha \ (g=gz)$$

$$Id3 = (W + Wgy) \alpha \ (g=gz)$$

$$Id4 = (W + Wgx) \alpha \ (g=gz)$$

$$\alpha(g=gz) = \mu C_i \ (g=gz) \ (V_g - V_{th} \ (g=gz))^2 / 2L \qquad (3)$$

Here, symbols $C_i$ (g=gz) and $V_{th}$ (g=gz) represent a capacitance and a threshold voltage of the field effect transistor that change in proportion to the gap 210 between the two sets of the electrode portions 192, 194 and 193, 195 of the acceleration detection portion and the silicon substrate 190, and $\alpha$ (g=gz) is a function that is determined by the changes of $C_i$ (g=gz) and $V_{th}$ (g=gz).

Accordingly, the following formula (4) can be derived from the formula (3):

$$\left. \begin{array}{rcl} Wgx/W & = & -(Id2 - Id4)/(Id2 + Id4) \\ Wgy/W & = & +(Id1 - Id3)/(Id1 + Id3) \end{array} \right\} \qquad (4)$$

Here, acceleration gx and gy in the X and Y directions are proportional to the displacement Wgz, Wgy of the gate width of the acceleration detection portions, respectively. Therefore, acceleration gx in the X direction is proportional to the difference of the drain currents Id2 and Id4 flowing through the fixed electrodes 213, 214 and 217, 218, respectively, from the formula (4), and acceleration gy in the Y direction is proportional to the difference of the drain currents Id1, Id2 flowing through the fixed electrodes 211, 212 and 215, 216 of the acceleration detection portions.

In this way, acceleration in the X and Y directions can be easily separated from acceleration in the Z direction.

When acceleration in the Z direction is further analyzed theoretically, acceleration in the Z direction is not determined by the ratio of the drain currents Id flowing through the acceleration detection portions unlike the detection of acceleration in the X and Y directions, but is given by computing the ΣId value as expressed by the formula (5).

$$Id1 + Id2 + Id3 + Id4 = 4W\alpha \ (g=gz) \qquad (5)$$

The result of the theoretical analysis described above is tabulated in Table 3.

TABLE 3

| displacement of mass | acceleration detector increase/decrease of drain current | | | |
|---|---|---|---|---|
| | 222 | 223 | 224 | 225 |
| +X direction | | decrease | | increase |
| −X direction | | increase | | decrease |
| +Y direction | decrease | | increase | |
| −Y direction | increase | | decrease | |
| +Z direction | decrease | decrease | decrease | decrease |
| −Z direction | increase | increase | increase | increase |

Table 3 shows how the drain currents Id flowing through the acceleration detectors 222, 223, 224, 225 so disposed as to orthogonally cross one another change when acceleration acts on the semiconductor accelerometer and the mass portion 200 undergoes displacement in the X, Y and Z direction, respectively. The table illustrates the increase and the decrease of the drain currents Id of the acceleration detectors 223, 225 when the mass portion 200 undergoes displacement in the X direction, the increase and the decrease of the drain currents Id of the acceleration detectors 222, 224 when the mass portion 200 undergoes displacement in the Y direction, and the increase and the decrease of the drain currents Id of the acceleration detectors 222 to 225 when the mass portion 200 undergoes displacement in the Z direction. Here, if acceleration acting on the semiconductor accelerometer acts opposite to the case described above, the increase and the decrease of the drain currents Id in the X, Y and Z directions all become opposite.

As described above, in this example, the gate electrode portions and the fixed electrodes of the acceleration detection portions comprising the field effect transistors are so disposed in two sets as to cross mutually orthogonally and to protrude, and the movable electrode 209 is thus allowed to move three-dimensionally. Accordingly, three-dimensional acceleration can be determined by one element (device).

As an application example of this example, any support structure may be used as the beam structure so long as the mass portion 200 can undergo three-dimensional displacement. In other words, three or more beams for keeping the balance of the movable portion of the movable electrode 209 can be used besides the beam having the doubly-supported structure as in this example, the beam having the cantilever structure, and two beams illustrated in this example.

EXAMPLE 10

The tenth embodiment of the first aspect of the present invention will now be explained.

Figure 44:
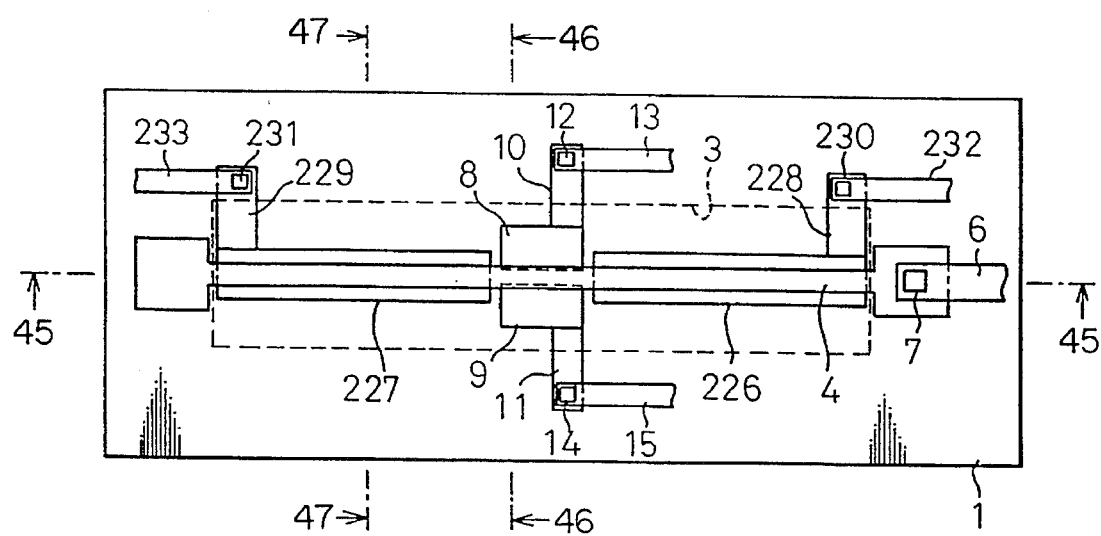
FIG. 44 is a plan view of a semiconductor accelerometer according to the tenth embodiment of the present invention.
Figure 45:
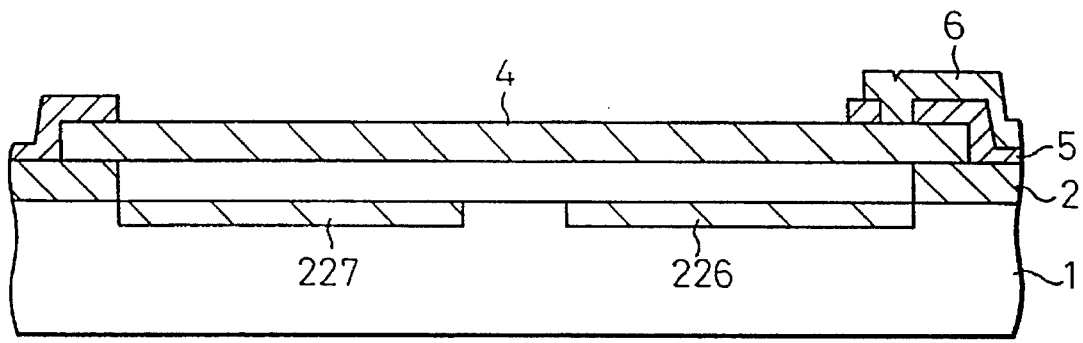
FIG. 45 is a sectional view taken along a line 45—45 of FIG. 44.
Figure 46:
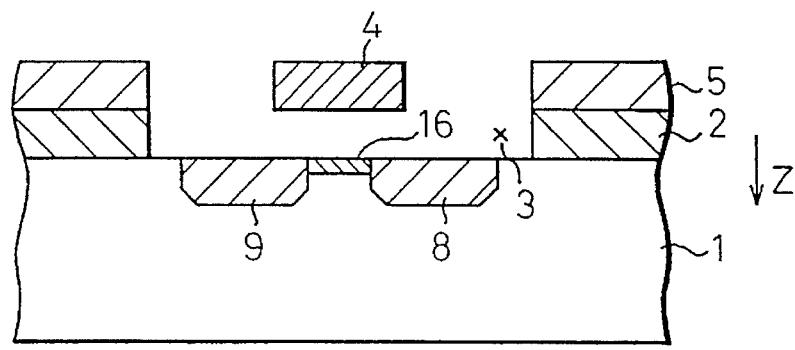
FIG. 46 is a sectional view taken along a line 46—46 of FIG. 44.
Figure 47:
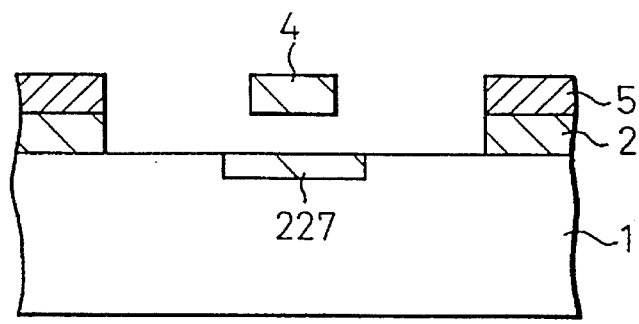
FIG. 47 is a sectional view taken along a line 47—47 of FIG. 44.

FIG. 44 is a plan view of the semiconductor accelerometer according to this example. FIG. 45 is a sectional view taken along a line 45—45 of FIG. 44, FIG. 46 is a sectional view taken along a line 46—46 of FIG. 44 and FIG. 47 is also a sectional view taken along a line 47—47 of FIG. 44.

In this example, fixed electrodes 8, 9 are formed in self-alignment with a movable electrode 4 having the doubly-supported structure on a P-type silicon substrate 1 at the center portion of the movable electrode 4, and lower electrodes 226, 227 are formed on the P-type silicon substrate 1 devoid of the fixed electrodes 8, 9 below the movable electrode 4. Diffusion electrodes 228, 229 are connected to the lower electrodes 226, 227, and are connected to aluminum wirings 232, 233 through contact holes 230, 231, respectively.

The lower electrodes 226, 227 are disposed so as to set a potential to the equal potential to the movable electrode 4 and to restrict the generation of the force of static electricity.

The other operations of this semiconductor accelerometer are the same as those of the first Example.

EXAMPLE 11

The eleventh embodiment of the first aspect of the present invention will be explained.

Figure 48:
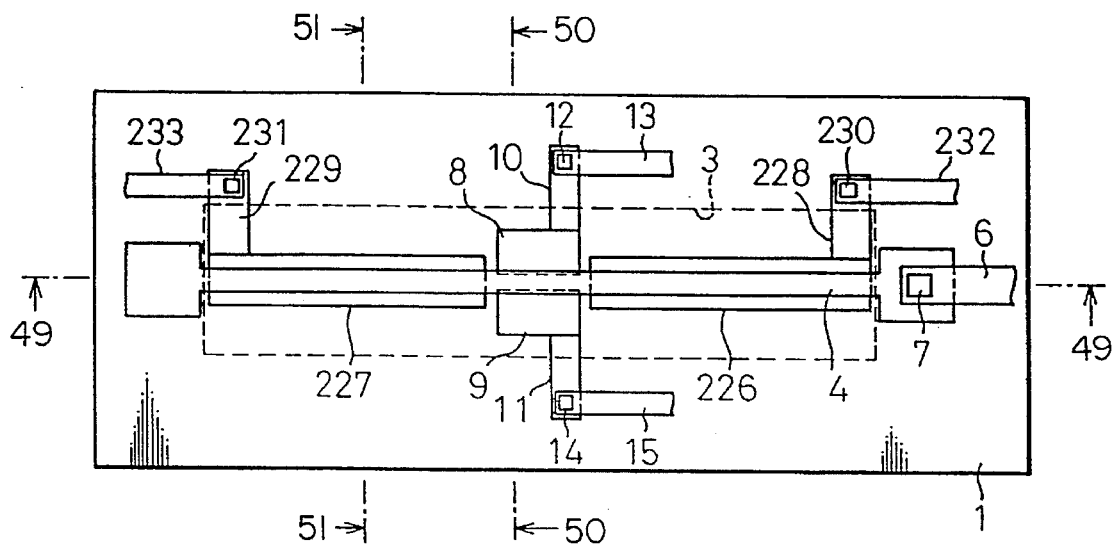
FIG. 48 is a plan view of a semiconductor accelerometer according to the eleventh embodiment of the present invention.
Figure 49:
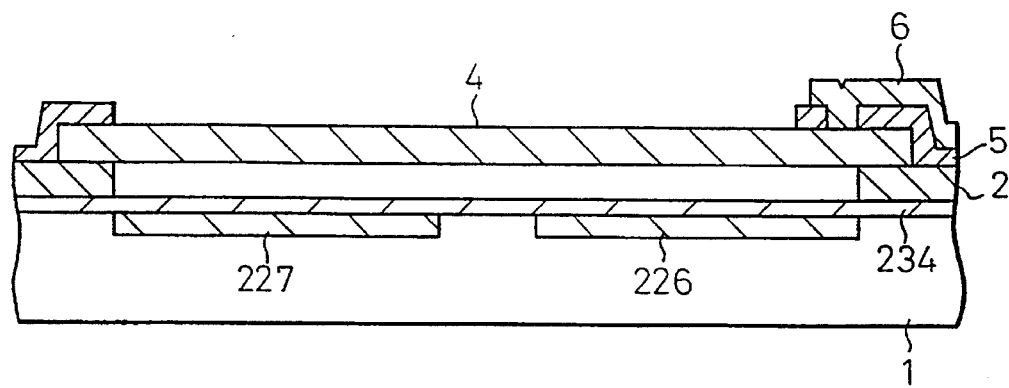
FIG. 49 is a sectional view taken along a line 49—49 of FIG. 48.
Figure 50:
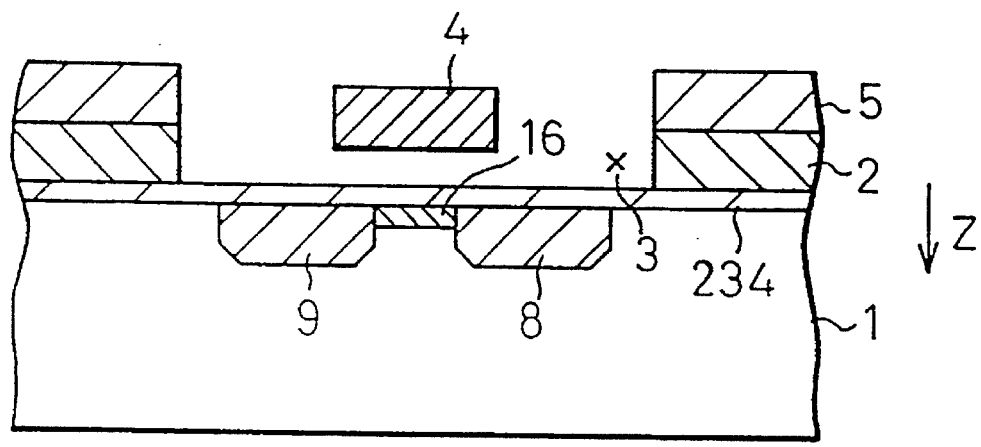
FIG. 50 is also a sectional view taken along a line 50—50 of FIG. 48.
Figure 51:
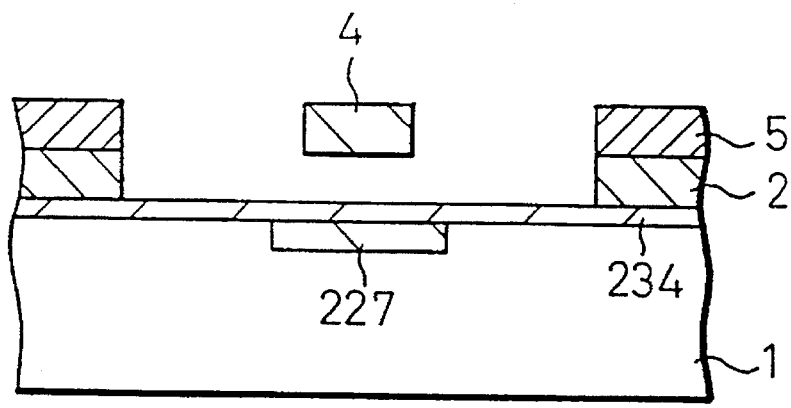
FIG. 51 is also a sectional view taken along a line 51—51 of FIG. 48.

FIG. 48 is a plan view of the semiconductor accelerometer of this Example, FIG. 49 is a sectional view taken along a line 49—49 of FIG. 48, FIG. 50 is a sectional view taken along a line 50—50 of FIG. 48, and FIG. 51 is a sectional view taken along a line 51—51 of FIG. 48.

In this example, an insulating film 234 is formed on the upper surface of a P-type silicon substrate 1. In other words, fixed electrodes 8, 9 are formed in self-alignment below the insulating film 234 at the center portion of a movable electrode 4, and lower electrodes 226, 227 are formed below the insulating film 234 below the portion of the movable electrode 4 devoid of the fixed electrodes 8, 9. Diffusion electrodes 228, 229 are connected to the lower electrodes 226, 227 and are further connected to aluminum wiring 232, 233 through contact holes 230, 231, respectively.

The lower electrodes 226, 227 are disposed so as to keep a potential at an equal potential to the movable electrode 4 and to restrict the occurrence of the force of static electricity.

When self-test of the sensor is carried out by providing a potential difference between the lower electrodes 226, 227 and the movable electrode 4 to generate virtual acceleration by the force of static electricity, the insulating film 234 can prevent damage of the circuit by short-circuit resulting from discharge between the electrodes or mutual contact of the electrodes, and fusion between the gate and the substrate.

EXAMPLE 12

The twelfth embodiment of the first aspect of the present invention will be explained.

Figure 52:
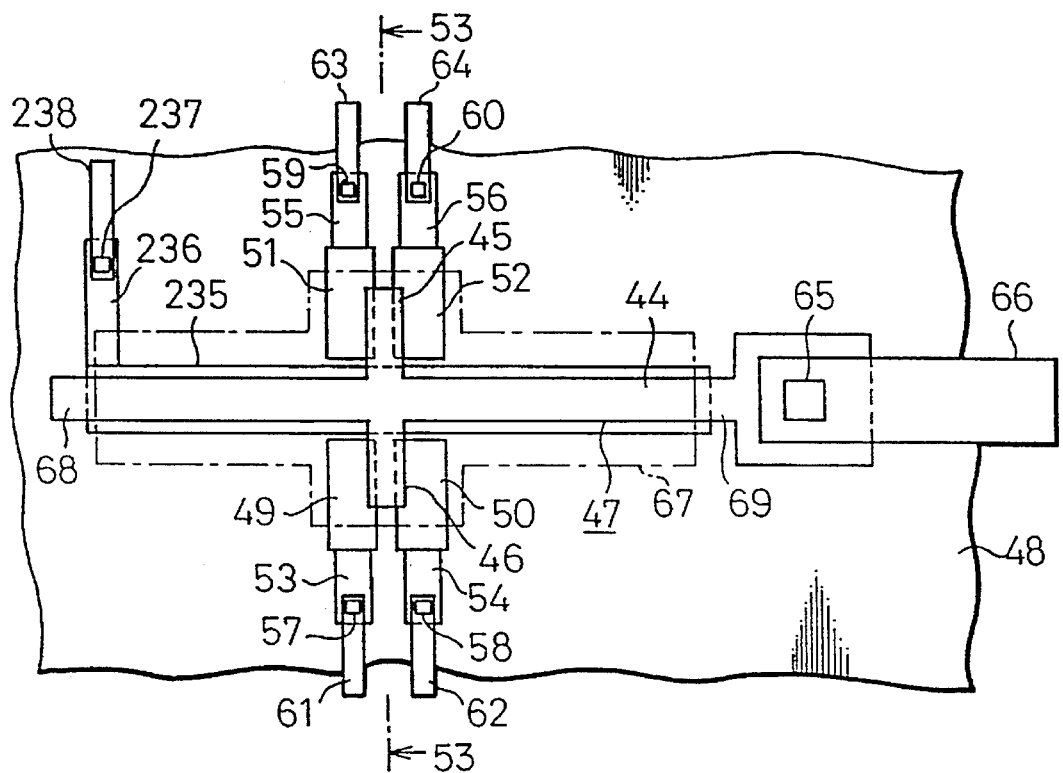
FIG. 52 is a plan view of a semiconductor accelerometer according to the twelfth embodiment of the present invention.
Figure 53:
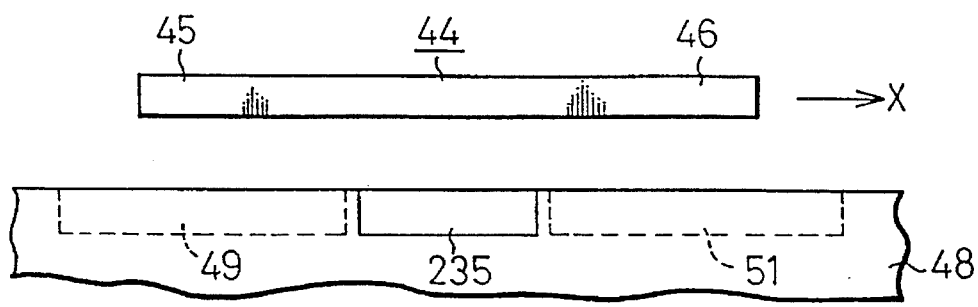
FIG. 53 is a sectional view taken along a line 53—53 of FIG. 52.

FIG. 52 is a plan view of the semiconductor accelerometer of this Example, and FIG. 53 is a sectional view taken along a line 53—53 of FIG. 52.

In this example, a lower electrode 235 is formed on a P-type silicon substrate 48 below a beam portion 44 with respect to the beam portion 44 of a movable electrode 47 having a doubly-supported beam structure. A diffusion electrode 236 is connected to this lower electrode 235 and is further connected to an aluminum wiring 238 through a contact hole 237.

This lower electrode 235 is disposed so as to keep a potential at an equal level to the beam portion 44 of the movable electrode 47 and to restrict the occurrence of the force of static electricity.

The other operation of the semiconductor accelerometer is the same as that of the second example.

EXAMPLE 13

The thirteenth embodiment of the first aspect of the present invention will be explained as Example 13.

Figure 54:
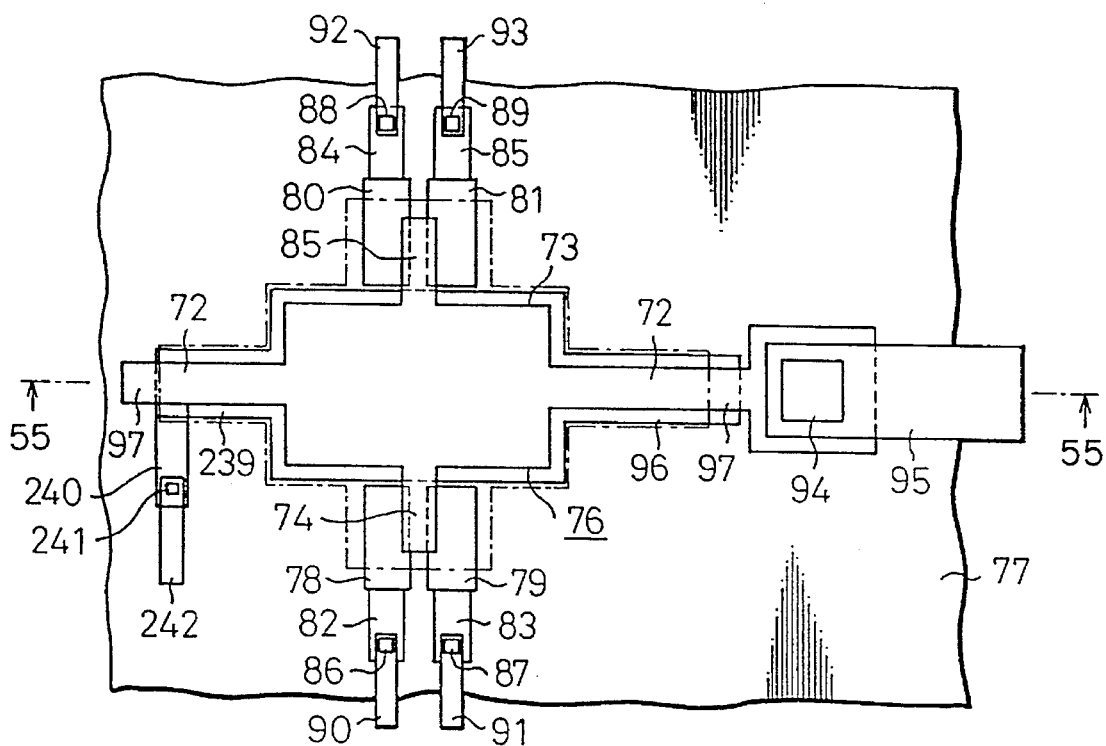
FIG. 54 is a plan view of a semiconductor accelerometer according to the thirteenth embodiment of the present invention.
Figure 55:
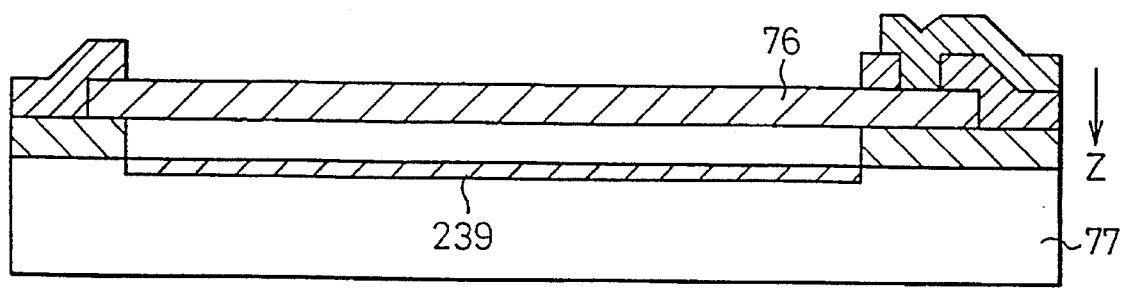
FIG. 55 is a sectional view taken along a line 55—55 of FIG. 54.

FIG. 54 is a plan view of the semiconductor accelerometer of this Example, and FIG. 55 is a sectional view taken along a line 55—55 of FIG. 54.

In this example, a lower electrode 239 is formed on a P-type silicon substrate 77 below a beam portion 72 of a movable electrode 76 having a doubly-supported beam structure and below a mass portion 73. A diffusion electrode 240 is connected to this lower electrode 239 and is further connected to an aluminum wiring 242 through a contact hole 241.

This lower electrode 239 keeps a potential at an equal level to the beam portion 72 of the movable electrode 76 and to the mass portion 73, and restricts the occurrence of the force of static electricity.

The other operation of the semiconductor accelerometer is the same as that of Example 3.

EXAMPLE 14

Another aspect of the present invention will be explained, thereunder. In the second aspect of the present invention, a lower gate electrode 245 may further be disposed between the fixed electrodes 8 and 9. In other words, in the second aspect of the present invention, a capacitor is constituted by a movable upper gate electrode and a lower gate electrode, and a field effect transistor is constituted by a gate oxide film, a lower gate electrode and a fixed electrode. The movable upper gate electrode undergoes displacement due to acceleration and the electro-static capacitance of the capacitor changes, so that the intensity of an electric field applied to the inversion layer of the transistor changes. As a result, acceleration is detected as the change of a drain current of the field effect transistor. The lower electrode is disposed at a portion opposing the movable upper electrode, and when this lower electrode is kept at an equal potential to the movable upper gate electrode, the force of static electricity occurring between the semiconductor substrate and the movable upper gate electrode can be minimized.

Figure 56:
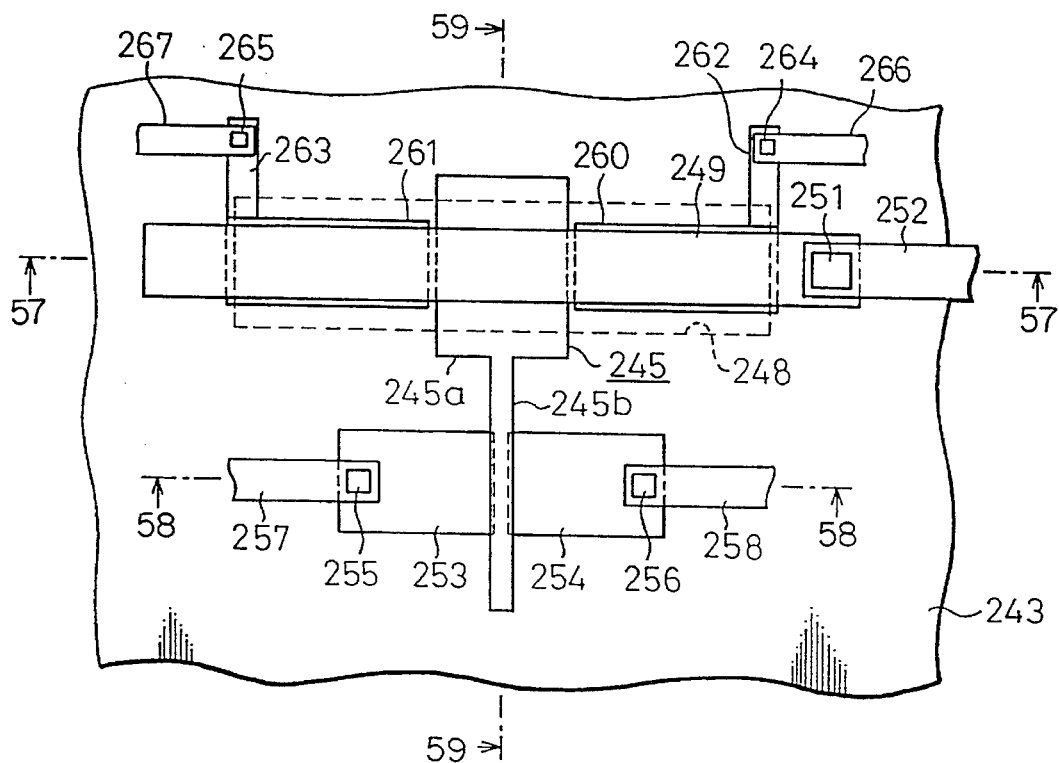
FIG. 56 is a plan view of a semiconductor accelerometer according to the fourteenth embodiment of the present invention.
Figure 57:
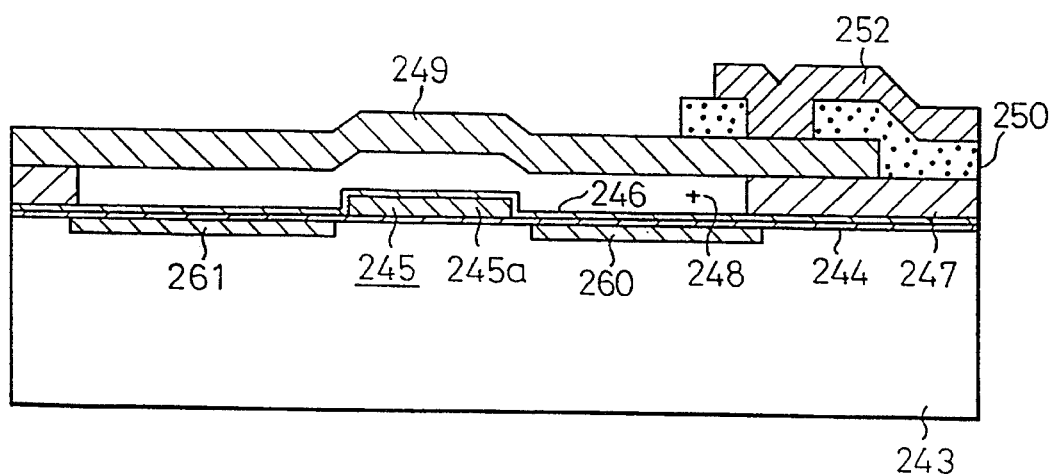
FIG. 57 is a sectional view taken along a line 57—57 of FIG. 56.

FIG. 56 is a plan view of the semiconductor accelerometer of the first embodiment of the second aspect of the present invention. FIG. 57 is a sectional view taken along a line 57—57 of FIG. 56, FIG. 58 is a sectional view taken along a line 58—58 of FIG. 56, and FIG. 59 is a sectional view taken along a line 59—59 of FIG. 56.

Figure 58:
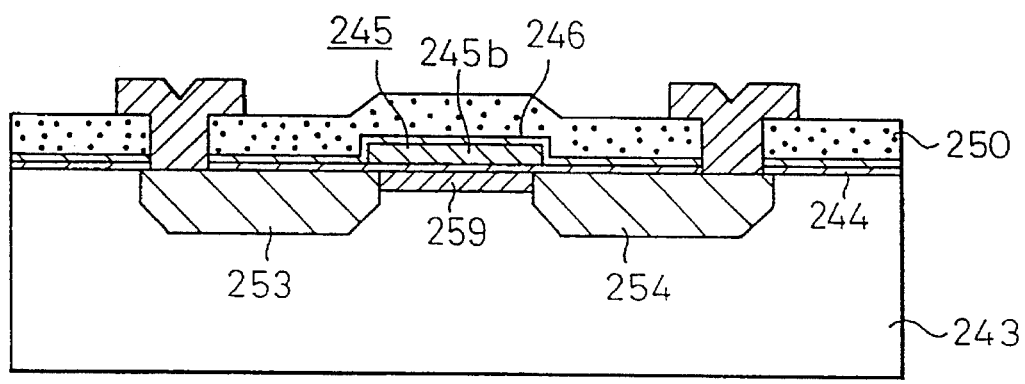
FIG. 58 is also a sectional view taken along a line 58—58 of FIG. 56.
Figure 59:
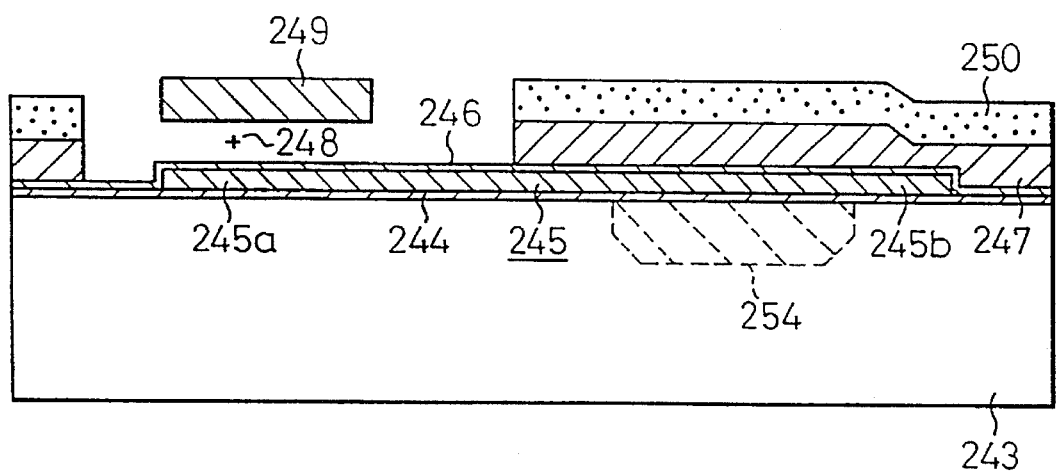
FIG. 59 is also a sectional view taken along a line 59—59 of FIG. 56.

As shown in FIGS. 57 to 59, a gate oxide film 244 is formed on a P-type silicon substrate 243. A lower (fixed) gate electrode 245 is disposed on the gate oxide film 244, and this lower gate electrode 245 consists of poly-Si. Insulating films 246 and 247 are formed on the gate oxide film 244 and the lower gate electrode 245, and are made of $SiO_2$, $Si_3N_4$, etc. A rectangular region devoid of the insulating film 247, that is, a gap portion 248, is formed on the insulating film 246 (see FIG. 56). As shown in FIG. 56, the lower gate electrode 245 comprises a rectangular portion 245a and a belt-like portion 245b extending from this rectangular portion 245a. The rectangular portion 245a is disposed on the bottom surface of the gap portion 248, and the belt-like portion 245b extends outside the gap portion 248. A movable electrode 249 having a double support beam structure is disposed on the insulating film 247 in such a manner as to bridge over the gap portion 248. This movable upper gate electrode 249 is made of poly-Si.

The gap portion 248 of the insulating film 247 below the movable upper gate electrode 249 is formed by etching as a sacrificial layer. When this sacrificial layer is etched, an etching solution which does not etch the movable upper gate electrode 249 and the insulating film 246 but etches the insulating film 247 as the sacrificial layer is used. The insulating film 246 need not exist when the gate oxide film 244 is not etched by the etching solution which etches the insulating film 247 as the sacrificial layer.

An inter-layer insulating film 250 is disposed on the insulating film 247, and aluminum wiring 252 for electrical connection with the movable upper gate electrode 249 through a contact hole 251 is disposed on the inter-layer insulating film 250.

In FIG. 58, fixed electrodes 253, 254 consisting of an impurity diffusion layer are formed on both sides of the belt-like portion 245b of the lower gate electrode 245 on the P-type silicon substrate 243. These fixed electrodes 253, 254 are formed by introducing an N-type impurity into the P-type silicon substrate 243 in self-alignment with the belt-like portion 245b of the lower gate electrode 245 by ion implantation or like means. By the way, a refractory metal such as tungsten may be used for the lower gate electrode 245 and for the movable upper gate electrode (doubly-supported beam) 249 besides poly-Si.

As shown in FIG. 56, the fixed electrodes 253, 254 are electrically connected to aluminum wiring 257, 258 through contact holes 255, 256, respectively. The aluminum wiring 257, 258, 252 are connected to an external electronic circuit.

The fixed electrodes 253, 254, the lower gate electrode 245 and the gate oxide film 244 together constitute the field effect transistor.

Accordingly, as shown in FIG. 58, when a voltage is applied to the lower gate electrode 245, the inversion layer 259 is formed between the fixed electrodes 253, 254 on the P-type silicon substrate 243, and a drain current flows between the fixed electrodes 253, 254.

As also shown in FIG. 56, lower electrodes 260, 261 are formed on both sides of the rectangular portion 245a of the lower gate electrode 245 on the P-type silicon substrate 243 below the movable upper gate electrode 249. The diffusion electrodes 262, 263 are connected to these lower electrodes 260, 261 and are further connected to aluminum wiring 266, 267 through contact holes 264, 265, respectively.

These lower electrodes 260, 261 keep a potential at an equal potential to the movable upper gate electrode 249 and restrict the occurrence of the force of static electricity.

This semiconductor accelerometer detects the change of the electrostatic capacitance constituted by the movable upper gate electrode 249 and the lower gate electrode 245 when it receives acceleration, as the change of the output of the field effect transistor (the change of the drain current). In other words, acceleration can be detected from the output change (the drain current change) of the field effect transistor generated by the displacement of the movable upper gate electrode 249 resulting from the action of acceleration.

As described above, the semiconductor accelerometer of this example includes the P-type silicon substrate 243 (the semiconductor substrate), the gate oxide film 244 disposed on the P-type silicon substrate 243, the lower gate electrode 245 disposed on the gate oxide film 244, the fixed electrodes 253, 254 consisting of the impurity diffusion layer and formed on both sides of the lower gate electrode 245 on the P-type silicon substrate 243 in self-alignment with the lower gate electrode 245, the movable upper gate electrode 249 having the beam structure and disposed on the P-type silicon substrate 243 separated by a predetermined gap from the lower gate electrode 245, and the lower gate electrodes 260, 261 disposed on the P-type silicon substrate 243 at its portion opposing the movable upper gate electrode 249 and keeping a potential at a potential equal to the movable upper gate electrode 249, and detects acceleration from the change of the current between the fixed electrodes 253, 254 resulting from the displacement of the movable upper gate electrode 249 due to the action of acceleration. In other words, the capacitor is constituted by the movable upper gate electrode 249 and the lower gate electrode 245, and the field effect transistor is constituted by the gate oxide film 244, the lower gate electrode 245 and the fixed electrodes 253, 254. When the movable upper gate electrode 249 undergoes displacement due to acceleration, the electrostatic capacitance of the capacitor changes and hence, the field intensity applied to the inversion layer of the transistor changes. As a result, acceleration is detected as the change of the drain current of the field effect transistor. The gate oxide film 244 is disposed on the inversion layer, and the operation of the field effect transistor is therefore stabilized. Furthermore, the lower electrodes 260, 261 are disposed at the portion opposing the movable upper gate electrode 249, and are kept at an equal potential to the movable upper gate electrode 249. In this way, the force of static electricity occurring between the silicon substrate 243 and the movable upper gate electrode 249 can be minimized.

EXAMPLE 15

Next, the second embodiment of the second aspect of the present invention will be explained as Example 15.

Figure 60:
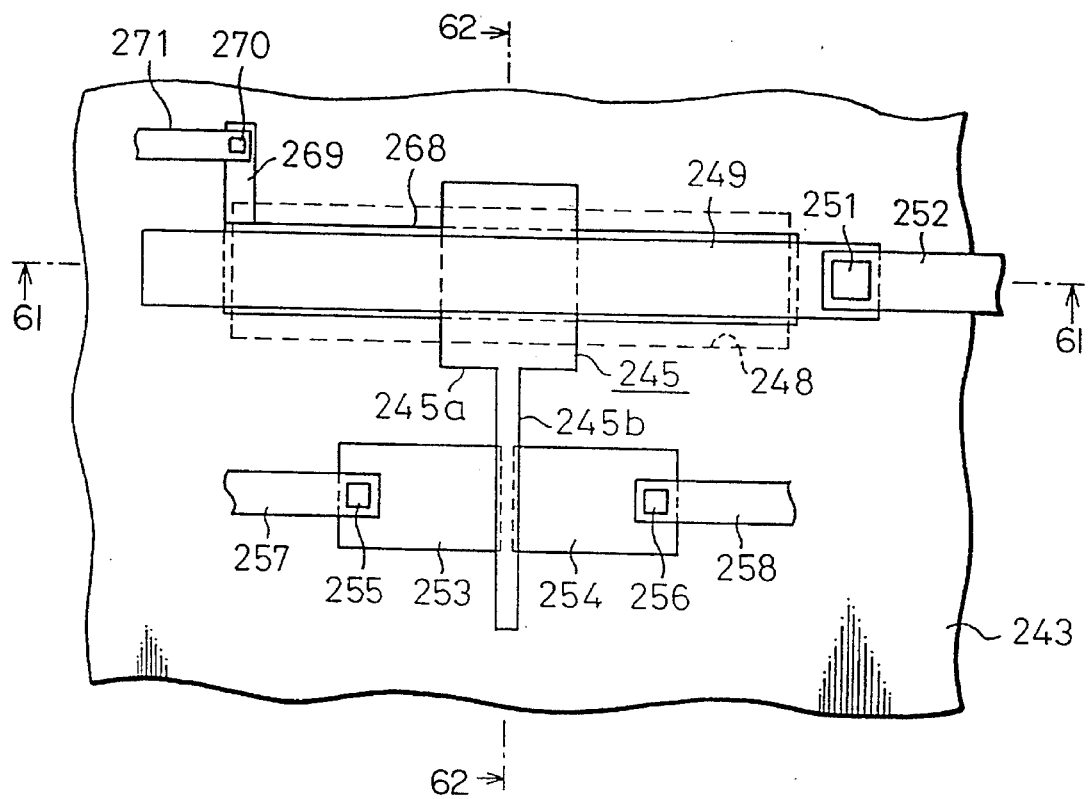
FIG. 60 is a plan view of a semiconductor accelerometer according to the fifteenth embodiment of the present invention.
Figure 61:
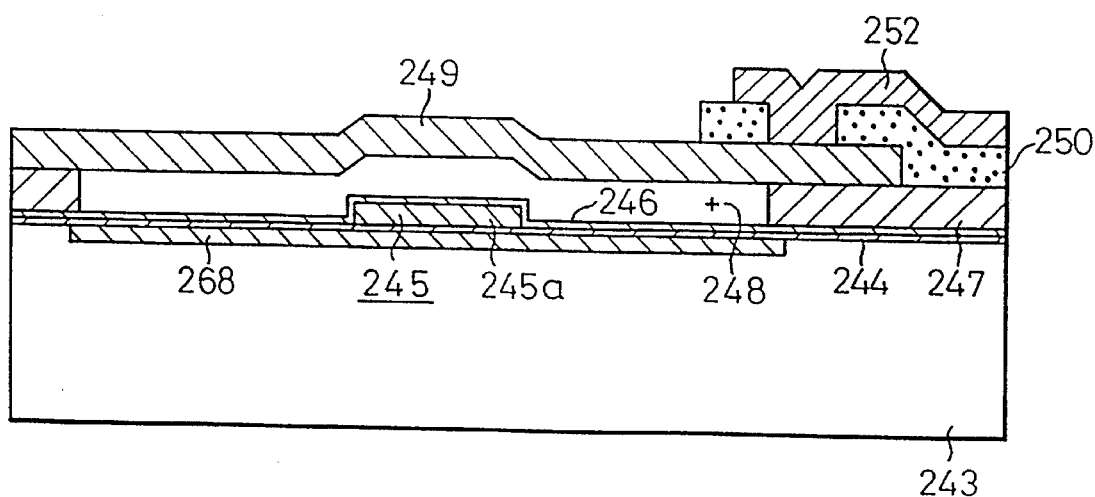
FIG. 61 is a sectional view taken along a line 61—61 of FIG. 60.
Figure 62:
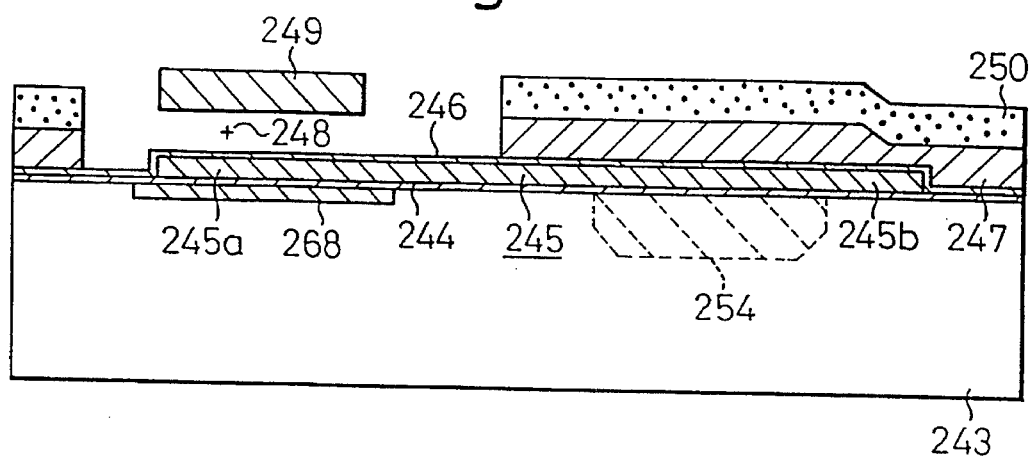
FIG. 62 is a sectional view taken along a line 62—62 of FIG. 60.

FIG. 60 is a plan view of the semiconductor accelerometer of this example, FIG. 61 is a sectional view taken along a line 61—61 of FIG. 60, and FIG. 62 is a sectional view taken along a line 62—62 of FIG. 60.

In this example, a lower electrode 268 is so disposed as to extend on a P-type silicon substrate 243 below a movable upper gate electrode 249. A diffusion electrode 269 is connected to this lower electrode 268, and is further connected to an aluminum wiring 271 through a contact hole 270.

EXAMPLE 16

The third embodiment of the second aspect of the present invention will be explained as Example 16.

Figure 63:
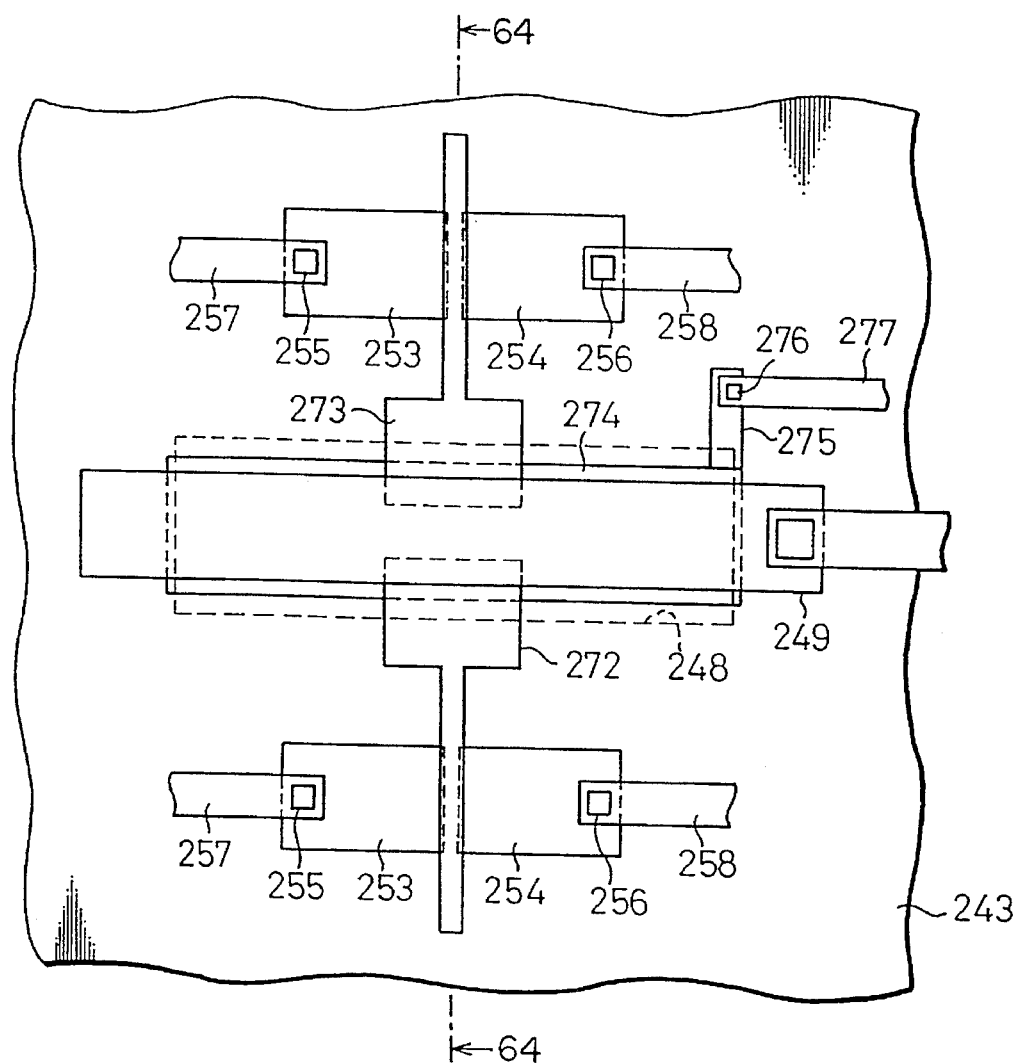
FIG. 63 is a plan view of a semiconductor accelerometer according to the sixteenth embodiment of the present invention.
Figure 64:
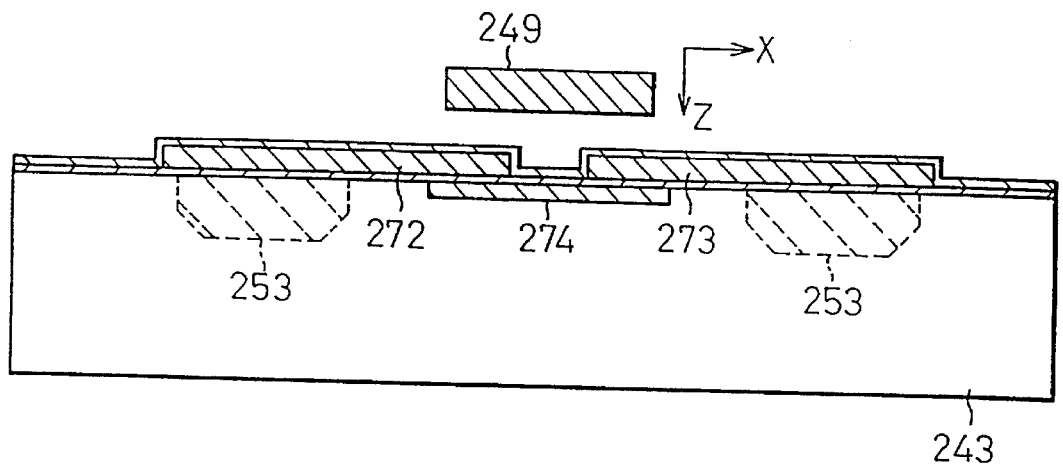
FIG. 64 is a sectional view taken along a line 64—64 of FIG. 63.

FIG. 63 is a plan view of the semiconductor accelerometer of this embodiment, and FIG. 64 is a sectional view taken along a line 64—64 of FIG. 63.

In this example, two field effect transistors are disposed for a movable upper gate electrode 249. Lower gate electrodes 272, 273 are disposed symmetrically for the movable upper gate electrode 249 in such a manner as to partially overlap with the upper gate electrode 249.

In FIG. 64, when a voltage is applied to the movable upper gate electrode 249, a voltage which is determined by the electrostatic capacitance constituted by the movable upper gate electrode 249 and the lower gate electrodes 272, 273 and the capacitance of the gate oxide film is applied to the lower gate electrodes 272, 273, and a drain current flows in each field effect transistor.

When the semiconductor accelerometer is accelerated and the movable upper gate electrode 249 undergoes displacement in the Z direction shown in FIG. 64, the gap between the movable upper gate electrode 249 and the lower gate electrodes 272, 273 becomes small. Accordingly, its electrostatic capacitance increases and hence, the drain current increases.

On the other hand, when the semiconductor accelerometer receives acceleration and the movable upper gate electrode 249 undergoes displacement in the X direction shown in FIG. 64, the overlap areas between the upper gate electrode 249 and the lower gate electrodes 272, 273 increases on one of the overlap portions and decreases on the other. As a result, the electrostatic capacitance between the movable upper gate electrode 249 and the lower gate electrodes 272, 273 increases on one of the overlap portions and decreases on the other. Accordingly, the drain current, too, increases on one of the overlap portions and decreases on the other. In this way, the semiconductor accelerometer of this example can detect two-dimensional acceleration by the increase and the decrease of the two current quantities.

The lower electrode 274 is so disposed below the movable upper gate electrode 249 as to extend on the P-type silicon substrate 243. A diffusion electrode 275 is connected to this lower electrode 274 and is further connected to an aluminum wiring 277 through a contact hole 276.

This lower electrode 274 keeps a potential at an equal potential to the movable upper gate electrode 249, and restricts the occurrence of the force of static electricity.

EXAMPLE 17

The fourth embodiment of the second aspect of the present invention will be explained as Example 17.

Figure 65:
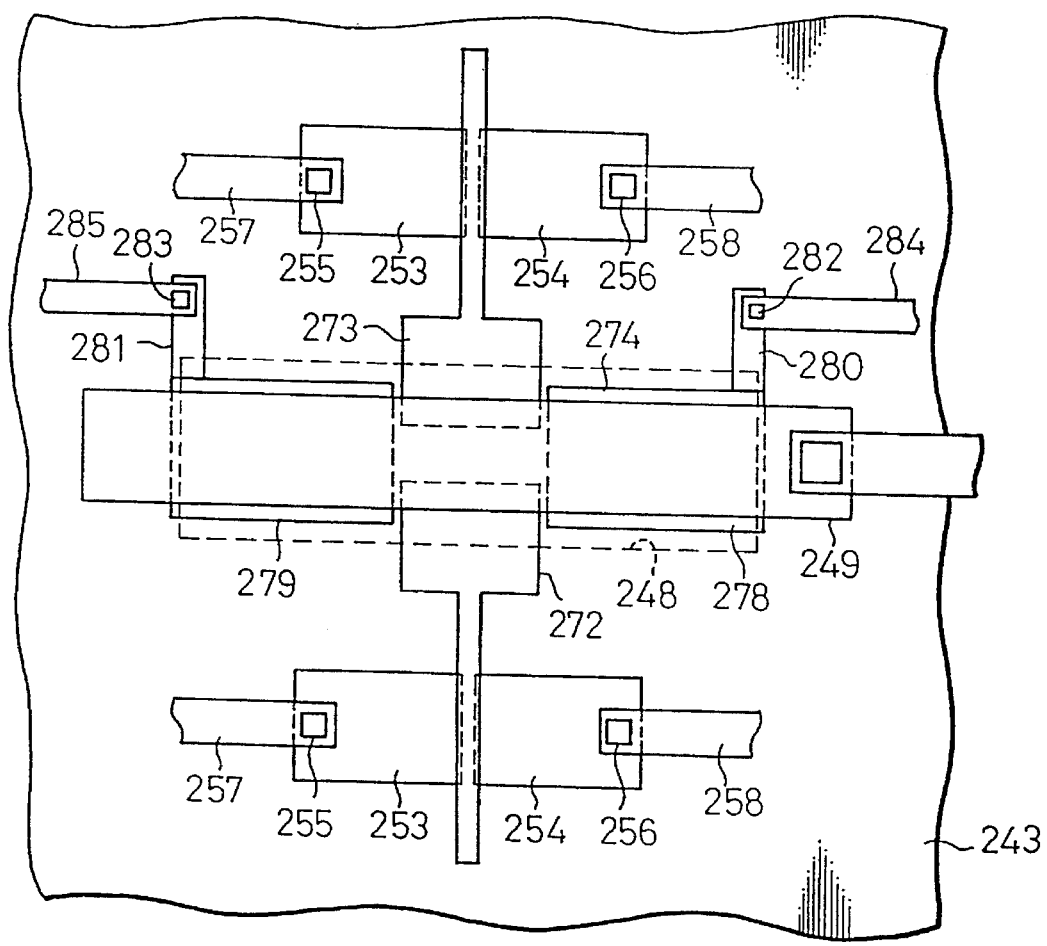
FIG. 65 is a plan view of a semiconductor accelerometer according to the seventeenth embodiment of the present invention.
Figure 66:
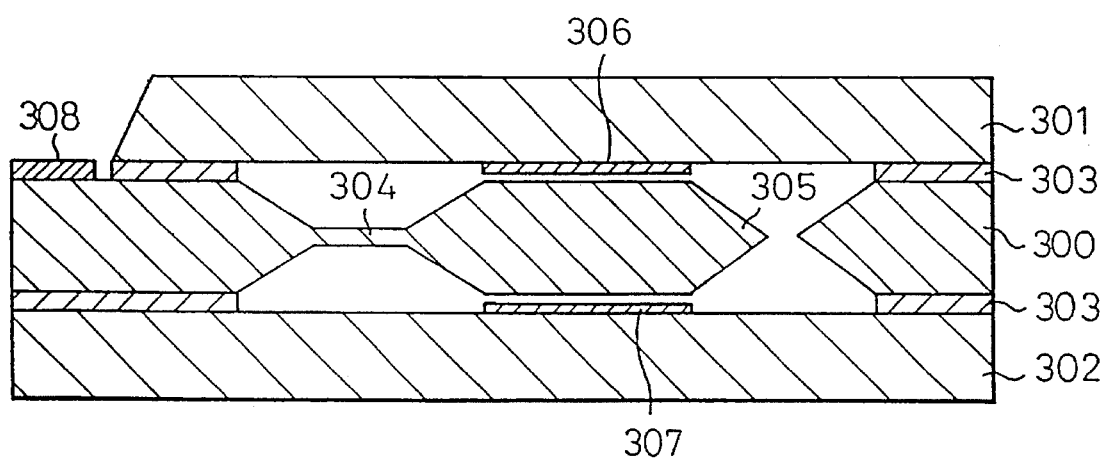
FIG. 66 is a sectional view showing a semiconductor accelerometer according to the prior art.

FIG. 65 is a plan view of the semiconductor accelerometer of this example.

In this example, lower electrodes 280, 281 are formed on both sides of lower gate electrodes 272, 273 on a P-type silicon substrate 243 below a movable upper gate electrode 249. Diffusion electrodes 280, 281 are connected to the lower electrodes 278, 279, and are further connected to aluminum wirings 284, 285 through contact holes 282, 283, respectively.

These lower electrodes 278, 279 keep a potential at an equal potential to the movable upper gate electrode 249 and restrict the occurrence of the force of static electricity.

By the way, the present invention is not particularly limited to each of the foregoing embodiments. For example, the explanation has so far been given for the semiconductor accelerometer using the P-type silicon substrate, but an N-type substrate may also be employed provided that in this case, the impurity of the diffusion layer is to be changed to the P-type. The explanation steps of the semiconductor accelerometer and the MOSFET for detection have been simplified in the foregoing description, and obviously, several production steps (for example, a device isolation step) have been omitted lest the characteristic features of the production steps become ambiguous as a whole.

The beam may be of the doubly-supported type or of the cantilever type. In the third example shown in FIG. 18, the number of beams is two, but three or more beams may be used in order to balance the movable portion.

As described above in detail, the present invention provides a novel semiconductor accelerometer comprising a smaller number of substrates and a production method thereof, and provides excellent effects.

We claim:

1. A semiconductor accelerometer comprising:

a semiconductor substrate;

a movable electrode disposed above said semiconductor substrate; and fixed electrodes formed on opposing sides of said movable electrode;

wherein said semiconductor substrate includes a lower electrode at a portion thereof opposing said movable electrode in a region substantially unoccupied by said fixed electrodes, and wherein said lower electrode is biased at the same voltage potential as the movable electrode.

2. A semiconductor accelerometer according to claim 1, wherein said lower electrode is adapted to reduce an electric field formed between said semiconductor substrate and said movable electrode.

3. A semiconductor accelerometer including:

a semiconductor substrate;

a movable electrode having a beam structure and being disposed above said semiconductor substrate with a gap therebetween, wherein said movable electrode has first and second pairs of electrode portions, wherein said first and second pairs of electrode portions, respectively, extend along orthogonal lines of direction; and fixed electrodes located on laterally opposite sides of each electrode portion of said first and second pairs of electrode portions, said fixed electrodes comprising respective impurity diffusion layer portions formed in said semiconductor substrate;

wherein a change in a current between said fixed electrodes is generated by a displacement of said movable electrode.

4. A semiconductor accelerometer according to claim 3, wherein said fixed electrodes are formed in self-alignment with said movable electrode.

5. A semiconductor accelerometer according to claim 3, wherein said change in current between said fixed electrodes corresponds to a change of a field intensity, and a vertical acceleration is detected according to said change in current.

6. A semiconductor accelerometer according to claim 3, wherein a change in current occurs due to a change of an area of an inversion layer region between said fixed electrodes, and a horizontal acceleration is detected from change in current.

7. A semiconductor accelerometer according to claim 3, wherein said semiconductor substrate includes a lower electrode opposite said movable electrode in a part of said substrate substantially unoccupied by said fixed electrodes.

8. A semiconductor accelerometer according to claim 7, which further includes an insulating film formed on said semiconductor substrate.

9. A semiconductor accelerometer according to claim 3, wherein said movable electrode is movable in horizontal biaxial directions, wherein-a portion of said movable electrode positioned between and above said fixed electrodes extends obliquely to said beam structure of said movable electrode so as to overlap said fixed electrodes, wherein said movable electrode has a pair of said obliquely extending portions which extend in mutually opposite directions.

10. A semiconductor accelerometer according to claim 3, wherein said movable electrode is provided with a reduced thickness portion at a part thereof.

11. a semiconductor accelerometer according to claim 13, further including:

a gate oxide film disposed on said semiconductor substrate; and a lower gate electrode disposed on said gate oxide film, wherein said fixed electrodes are formed on opposite sides of said lower gate electrode on said semiconductor substrate in self-alignment with said lower gate electrode;

wherein said movable electrode is a movable upper gate electrode having a beam structure and being disposed above said semiconductor substrate as to be spaced apart by a gap from said lower gate electrode;

wherein said lower electrode is disposed on said oxide film opposite said movable upper gate electrode;

wherein acceleration is detected by the change of a current between said fixed electrodes, said change in current being generated by a displacement of said movable upper gate electrode caused by an acceleration.

12. A semiconductor accelerometer comprising:

a semiconductor substrate;

a movable electrode having a beam structure and being disposed above said semiconductor substrate with a gap therebetween; and fixed electrodes formed on laterally opposite sides of said movable electrode, said fixed electrodes comprising impurity diffusion layers formed in said semiconductor substrate;

wherein said semiconductor substrate includes a lower electrode that opposes said movable electrode in at least a region unoccupied by said fixed electrodes, said lower electrode being adapted to dissipate an electrostatic force generated between said semiconductor substrate and said movable electrode.

13. A semiconductor accelerometer according to claim 12, wherein said fixed electrodes are formed in self-alignment with said movable electrode.

14. A semiconductor accelerometer according to claim 12, wherein said change in current between said fixed electrodes corresponds to a change of a field intensity, and a vertical acceleration is detected according to said change in current.

15. A semiconductor accelerometer according to claim 12, wherein a change in current occurs due to a change of an area of an inversion layer region between said fixed electrodes, and a horizontal acceleration is detected from change in current.

16. A semiconductor accelerometer according to claim 12, which further includes an insulating film formed on said semiconductor substrate.

17. A semiconductor accelerometer according to claim 12, wherein said movable electrode is movable in horizontal biaxial directions, wherein a portion of said movable electrode positioned between and above said fixed electrodes extends obliquely to said beam structure of said movable electrode so as to overlap said fixed electrodes, wherein said movable electrode has a pair of said obliquely extending portions which extend in mutually opposite directions.

18. A semiconductor accelerometer according to claim 12, wherein said movable electrode is provided with a reduced thickness portion at a part thereof.

19. A semiconductor accelerometer according to claim 12, wherein said movable electrode is three-dimensionally movable, has four electrode portions protruding in mutually and orthogonally crossing directions, and said fixed electrodes are so disposed as to correspond to said electrode portions.

20. A semiconductor accelerometer according to claim 13, wherein said change in current between said fixed electrodes corresponds to a change of a field intensity, and a vertical acceleration is detected according to said change in current.

21. A semiconductor accelerometer according to claim 13, wherein a change in current occurs due to a change of an area of an inversion layer region between said fixed electrodes, and a horizontal acceleration is detected from change in current.

22. A semiconductor accelerometer according to claim 13, which further includes an insulating film formed on said semiconductor substrate.

23. A semiconductor accelerometer according to claim 13, wherein said movable electrode is movable in horizontal biaxial directions, wherein a portion of said movable electrode positioned between and above said fixed electrodes extends obliquely to said beam structure of said movable electrode so as to overlap said fixed electrodes, wherein said movable electrode has a pair of said obliquely extending portions which extend in mutually opposite directions.

24. A semiconductor accelerometer according to claim 13, wherein said movable electrode is provided with a reduced thickness portion at a part thereof.

25. A semiconductor accelerometer according to claim 13, wherein said movable electrode is three-dimensionally movable, has four electrode portions protruding along mutually and orthogonally crossing directions, and said fixed electrodes are so disposed as to correspond to said electrode portions.

* * * * *